US012263362B2

(12) United States Patent
Kwon et al.

(10) Patent No.: US 12,263,362 B2
(45) Date of Patent: Apr. 1, 2025

(54) MASK APPARATUS AND METHOD FOR CONTROLLING THE SAME

(71) Applicant: LG Electronics Inc., Seoul (KR)

(72) Inventors: Taewook Kwon, Seoul (KR); Jinmoo Park, Seoul (KR); Junchan Kwon, Seoul (KR); Seonghun Lee, Seoul (KR); Hyengcheul Choi, Seoul (KR); Gyunghwan Yuk, Seoul (KR); Minsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 930 days.

(21) Appl. No.: 17/231,466

(22) Filed: Apr. 15, 2021

(65) Prior Publication Data

US 2021/0402222 A1 Dec. 30, 2021

(30) Foreign Application Priority Data

Jun. 30, 2020 (KR) ........................ 10-2020-0080417

(51) Int. Cl.
*A62B 18/00* (2006.01)
*A62B 7/10* (2006.01)
(Continued)

(52) U.S. Cl.
CPC .............. *A62B 18/006* (2013.01); *A62B 7/10* (2013.01); *A62B 9/00* (2013.01); *A62B 18/025* (2013.01); *A62B 18/08* (2013.01)

(58) Field of Classification Search
CPC .. A62B 7/00; A62B 7/10; A62B 18/00; A62B 18/006; A62B 18/02; A62B 18/025;
(Continued)

(56) References Cited

U.S. PATENT DOCUMENTS 4,050,458 A * 9/1977 Friend ................. A61M 16/024 128/204.23
4,546,793 A 10/1985 Stupecky
(Continued)

FOREIGN PATENT DOCUMENTS

CN 1455270 11/2003
CN 103505788 1/2014
(Continued)

OTHER PUBLICATIONS

Office Action in Japanese Appln. No. 2020-204668, dated Feb. 7, 2022, 12 pages (with English translation).
(Continued)

*Primary Examiner* — Colin W Stuart
(74) *Attorney, Agent, or Firm* — Fish & Richardson P.C.

(57) ABSTRACT

A mask apparatus includes a mask body, a fan module, a seal that defines a breathing space, a pressure sensor coupled to the mask body and configured to sense an air pressure in the breathing space, and a controller coupled to the mask body and configured to control a rotation speed of the fan module based on the air pressure. The controller is configured to determine a breathing cycle based on a maximum pressure value and a minimum pressure value among air pressure values sensed by the pressure sensor, determine a time difference between a maximum time point and a minimum time point, determine an expected time point of inhalation in a subsequent breathing cycle based on the breathing cycle and the time difference, and increase the rotation speed of the fan module based on a current time corresponding to the expected time point of inhalation.

20 Claims, 12 Drawing Sheets

(51) Int. Cl.
*A62B 9/00* (2006.01)
*A62B 18/02* (2006.01)
*A62B 18/08* (2006.01)

(58) Field of Classification Search
CPC ....... A62B 18/04; A62B 18/045; A62B 18/08; A62B 23/00; A62B 9/00; A41D 13/11; A42B 3/286; A61B 2562/0247; A61B 5/091
See application file for complete search history.

(56) References Cited

U.S. PATENT DOCUMENTS

| | | | |
|---|---|---|---|
| 4,646,732 | A | 3/1987 | Chien |
| 5,062,421 | A | 11/1991 | Burns et al. |
| 5,372,130 | A | 12/1994 | Stern et al. |
| 5,782,234 | A | 7/1998 | Bates |
| 6,213,119 | B1 | 4/2001 | Brydon et al. |
| 6,543,450 | B1 | 4/2003 | Flynn |
| 8,667,959 | B2 | 3/2014 | Tilley et al. |
| 10,226,542 | B2 | 3/2019 | Messina et al. |
| 10,342,999 | B2 | 7/2019 | Song et al. |
| 10,661,104 | B2 | 5/2020 | Morgan et al. |
| 11,241,594 | B2 | 2/2022 | Szasz et al. |
| 2003/0052279 | A1 | 3/2003 | Kikuchi |
| 2003/0066257 | A1 | 4/2003 | Shovlin |
| 2003/0066527 | A1 | 4/2003 | Chen |
| 2005/0145249 | A1 | 7/2005 | Solyntjes et al. |
| 2006/0076012 | A1 | 4/2006 | Tanizawa et al. |
| 2007/0125385 | A1 | 6/2007 | Ho et al. |
| 2009/0320847 | A1 | 12/2009 | Bozanic et al. |
| 2010/0101575 | A1 | 4/2010 | Fedorko et al. |
| 2010/0224190 | A1 | 9/2010 | Tilley et al. |
| 2010/0313892 | A1 | 12/2010 | Shigematsu et al. |
| 2010/0329924 | A1 | 12/2010 | Harris |
| 2011/0126713 | A1 | 6/2011 | Legare et al. |
| 2014/0216475 | A1 | 8/2014 | Blomberg et al. |
| 2014/0360501 | A1 | 12/2014 | Guiducci et al. |
| 2015/0034080 | A1 | 2/2015 | Furuichi et al. |
| 2015/0047642 | A1 | 2/2015 | Tucker et al. |
| 2015/0136142 | A1 | 5/2015 | Blomberg |
| 2015/0151143 | A1 | 6/2015 | Langford |
| 2015/0202473 | A1 | 7/2015 | Curran et al. |
| 2015/0217144 | A1 | 8/2015 | Skov et al. |
| 2015/0217146 | A1 | 8/2015 | Skov et al. |
| 2015/0250915 | A1 | 9/2015 | Pugh et al. |
| 2015/0289598 | A1 | 10/2015 | Hsiung |
| 2015/0306324 | A1 | 10/2015 | Ayon et al. |
| 2015/0362478 | A1 | 12/2015 | Phillips |
| 2016/0001111 | A1 | 1/2016 | Morgan et al. |
| 2016/0022944 | A1 | 1/2016 | Chodkowski et al. |
| 2016/0030778 | A1 | 2/2016 | Skov et al. |
| 2016/0030779 | A1 | 2/2016 | Twu et al. |
| 2016/0074604 | A1 | 3/2016 | Bronner et al. |
| 2016/0236016 | A1 | 8/2016 | Ono et al. |
| 2016/0279450 | A1 | 9/2016 | Goldstein et al. |
| 2017/0136271 | A1 | 5/2017 | Munster |
| 2017/0157353 | A1 | 6/2017 | Olsen et al. |
| 2018/0078798 | A1 | 3/2018 | Fabian et al. |
| 2018/0177965 | A1 | 6/2018 | Patel |
| 2018/0185677 | A1 | 7/2018 | Curran et al. |
| 2018/0236275 | A1 | 8/2018 | Song et al. |
| 2018/0318457 | A1 | 11/2018 | Lucio |
| 2019/0009114 | A1 | 1/2019 | Han |
| 2019/0113501 | A1 | 4/2019 | Jameson et al. |
| 2019/0160249 | A1 | 5/2019 | Rose et al. |
| 2019/0175962 | A1 | 6/2019 | Su et al. |
| 2019/0275357 | A1 | 9/2019 | Palmer, Jr. et al. |
| 2020/0008539 | A1 | 1/2020 | Kolasa |
| 2020/0038614 | A1 | 2/2020 | Duff et al. |
| 2020/0086071 | A1 | 3/2020 | Lin et al. |
| 2020/0087031 | A1 | 3/2020 | Yoo et al. |
| 2020/0129650 | A1 | 4/2020 | Kim et al. |
| 2020/0155877 | A1 | 5/2020 | Key et al. |
| 2021/0228920 | A1 | 7/2021 | Arigue et al. |
| 2021/0337891 | A1 | 11/2021 | Shah et al. |
| 2021/0378325 | A1 | 12/2021 | Mun et al. |
| 2021/0379412 | A1 | 12/2021 | Lee et al. |
| 2021/0379418 | A1 | 12/2021 | Kim et al. |
| 2022/0016449 | A1 | 1/2022 | Choi et al. |

FOREIGN PATENT DOCUMENTS

| | | | |
|---|---|---|---|
| CN | 103751919 | | 4/2014 |
| CN | 104162236 | | 11/2014 |
| CN | 203943119 | | 11/2014 |
| CN | 104826247 | | 8/2015 |
| CN | 204637356 | | 9/2015 |
| CN | 105126219 | | 12/2015 |
| CN | 105167366 | | 12/2015 |
| CN | 105476118 | | 4/2016 |
| CN | 105495776 | | 4/2016 |
| CN | 105641821 | | 6/2016 |
| CN | 205285072 | | 6/2016 |
| CN | 106039607 | | 10/2016 |
| CN | 106235464 | | 12/2016 |
| CN | 106253937 | | 12/2016 |
| CN | 106730464 | | 5/2017 |
| CN | 106847663 | | 6/2017 |
| CN | 107149182 | | 9/2017 |
| CN | 206459266 | | 9/2017 |
| CN | 107224687 | | 10/2017 |
| CN | 206577264 | | 10/2017 |
| CN | 107308564 | | 11/2017 |
| CN | 107405508 | | 11/2017 |
| CN | 107735148 | | 2/2018 |
| CN | 206995630 | | 2/2018 |
| CN | 207011751 | | 2/2018 |
| CN | 207040968 | | 2/2018 |
| CN | 207041756 | | 2/2018 |
| CN | 207152901 | | 3/2018 |
| CN | 207604526 | | 7/2018 |
| CN | 207721249 | | 8/2018 |
| CN | 207836817 | | 9/2018 |
| CN | 108635689 | | 10/2018 |
| CN | 208145256 | | 11/2018 |
| CN | 109078277 | | 12/2018 |
| CN | 208403333 | | 1/2019 |
| CN | 208611622 | | 3/2019 |
| CN | 208694061 | | 4/2019 |
| CN | 109924568 | | 6/2019 |
| CN | 111135492 | | 5/2020 |
| CN | 111565763 | | 8/2020 |
| EP | 0558147 | | 9/1993 |
| EP | 0621056 | | 10/1994 |
| EP | 2913083 | | 9/2015 |
| EP | 3446755 | | 2/2019 |
| EP | 3446756 | | 2/2019 |
| EP | 3919132 | A1 | 12/2021 |
| GB | 1155046 | | 6/1969 |
| JP | H05137808 | | 6/1993 |
| JP | 3039303 | | 7/1997 |
| JP | H09225012 | | 9/1997 |
| JP | 10066817 | | 3/1998 |
| JP | H10165527 | | 6/1998 |
| JP | 3077655 | | 5/2001 |
| JP | 2003322712 | | 11/2003 |
| JP | 2004364177 | | 12/2004 |
| JP | 3117209 | U | 1/2006 |
| JP | 2007236600 | | 9/2007 |
| JP | 2011078604 | | 4/2011 |
| JP | 2011078678 | | 4/2011 |
| JP | 2011115449 | | 6/2011 |
| JP | 2012-075793 | | 4/2012 |
| JP | 2013127129 | | 6/2013 |
| JP | 3196218 | | 2/2015 |
| JP | 2015093036 | | 5/2015 |
| JP | 2015-524337 | | 8/2015 |
| JP | 2015527130 | | 9/2015 |
| JP | 2016087376 | | 5/2016 |
| JP | 2018000982 | | 1/2018 |
| JP | 2018033905 | | 3/2018 |
| JP | 2018089158 | | 6/2018 |
| JP | 2018-146805 | | 9/2018 |

(56) References Cited

FOREIGN PATENT DOCUMENTS

| | | |
|---|---|---|
| JP | 2019501721 | 1/2019 |
| KR | 10-1995-0008732 | 8/1995 |
| KR | 20050061384 | 6/2005 |
| KR | 20100081991 | 7/2010 |
| KR | 20-2010-0009804 | 10/2010 |
| KR | 1020110067854 | 6/2011 |
| KR | 20120051735 | 5/2012 |
| KR | 200461294 | 7/2012 |
| KR | 101228403 | 1/2013 |
| KR | 101536265 | 7/2015 |
| KR | 101554664 | 9/2015 |
| KR | 101619487 | 5/2016 |
| KR | 20160062808 | 6/2016 |
| KR | 20160129562 | 11/2016 |
| KR | 20160132159 | 11/2016 |
| KR | 101733470 | 4/2017 |
| KR | 20170111132 | 10/2017 |
| KR | 20170126163 | 11/2017 |
| KR | 20180009326 | 1/2018 |
| KR | 10-2018-0012496 | 2/2018 |
| KR | 101827016 | 2/2018 |
| KR | 1020180027561 | 3/2018 |
| KR | 101849610 | 4/2018 |
| KR | 20180043234 | 4/2018 |
| KR | 20180045934 | 5/2018 |
| KR | 20180064284 | 6/2018 |
| KR | 20180091698 | 8/2018 |
| KR | 20180128040 | 11/2018 |
| KR | 10-2018-0130658 | 12/2018 |
| KR | 101925388 | 12/2018 |
| KR | 1020180135840 | 12/2018 |
| KR | 10-1942785 | 1/2019 |
| KR | 20190033299 | 3/2019 |
| KR | 1020190033299 | 3/2019 |
| KR | 10-2019-0053757 | 5/2019 |
| KR | 10-2019-0022668 | 6/2019 |
| KR | 102002878 | 7/2019 |
| KR | 1020190089188 | 7/2019 |
| KR | 1020190096496 | 8/2019 |
| KR | 1020190100605 | 8/2019 |
| KR | 102023974 | 9/2019 |
| KR | 10-2019-0119804 | 10/2019 |
| KR | 101997813 | 10/2019 |
| KR | 102065360 | 2/2020 |
| KR | 1020200033495 | 3/2020 |
| KR | 102110687 | 5/2020 |
| KR | 20200048502 | 5/2020 |
| KR | 1020200048502 | 5/2020 |
| KR | 1020200049490 | 5/2020 |
| KR | 1020200079925 | 7/2020 |
| TW | 201201879 | 1/2012 |
| TW | M555232 | 2/2018 |
| TW | 201904614 | 2/2019 |
| WO | WO 1996/22124 | 7/1996 |
| WO | WO2009067583 | 5/2009 |
| WO | WO2010070495 | 6/2010 |
| WO | WO2014020469 | 2/2014 |
| WO | WO 2016/072868 | 5/2016 |
| WO | WO2016157159 | 10/2016 |
| WO | WO20170004313 | 1/2017 |
| WO | WO2017116174 | 7/2017 |
| WO | WO2018036902 | 3/2018 |
| WO | WO2018147941 | 8/2018 |
| WO | WO 2019/059699 | 3/2019 |
| WO | WO2020055106 | 3/2020 |
| WO | WO2020094850 | 5/2020 |

OTHER PUBLICATIONS

Office Action in Korean Appln. No. 10-2020-0080437, dated Feb. 21, 2022, 13 pages (with English translation).

Office Action in Korean Appln. No. 10-2020-0068421, dated Jan. 23, 2022, 12 pages (with English translation).

Office Action in Chinese Appln. No. 202011403700.7, dated May 4, 2023, 18 pages (with English translation).

Office Action in Chinese Appln. No. 202110096186.5, dated Jun. 3, 2023, 16 pages (with English translation).

Office Action in U.S. Appl. No. 17/230,206, filed Jun. 22, 2023, 18 pages.

Office Action in U.S. Appl. No. 17/231,472, filed Jun. 23, 2023, 23 pages.

Notice of Allowance in U.S. Appl. No. 17/178,103, filed Nov. 3, 2023, 12 pages.

Office Action in Korean Appln. No. 10-2022-0126062, mailed on Sep. 26, 2023, 8 pages (with English translation).

Office Action in U.S. Appl. No. 17/112,500, filed Nov. 28, 2023, 14 pages.

Office Action in U.S. Appl. No. 17/230,206, filed Oct. 12, 2023, 19 pages.

Office Action in U.S. Appl. No. 17/231,472, filed Oct. 23, 2023, 19 pages.

Office Action in U.S. Appl. No. 17/244,683, filed Oct. 13, 2023, 21 pages.

Extended European Search Report in European Appln. No. 20217535.2, dated Jun. 22, 2021, 4 pages.

Extended European Search Report in European Appln. No.20217537.8, dated Jun. 22, 2021, 4 pages.

Office Action in Korean Appln. No. 10-2020-0068404, dated Jun. 30, 2021, 12 pages (with English translation).

Office Action in Korean Appln. No. 10-2020-0068611, dated Jun. 30, 2021, 12 pages (with English translation).

Office Action in Taiwanese Appln. No. 109146705, dated Jul. 7, 2021, 19 pages (with English translation).

Office Action in Taiwanese Appln. No. 110102539, dated Jul. 12, 2021, 10 pages (with English translation).

Office Action in Taiwanese Appln. No. 110102540, dated Jul. 12, 2021, 19 pages (with English translation).

Office Action in Taiwanese Appln. No. 110105039, dated Jul. 12, 2021, 15 pages (with English translation).

Extended European Search Report in European Appln. No. 20217533.7, dated Jun. 8, 2021, 5 pages.

Korean Office Action in Korean Appln. No. 2020-0068404, dated Apr. 5, 2021, 11 pages (with English translation).

Korean Office Action in Korean Appln. No. 2020-0068407, dated Apr. 5, 2021, 11 pages (with English translation).

Korean Office Action in Korean Appln. No. 2020-0068611, dated Apr. 5, 2021, 11 pages (with English translation).

Korean Office Action in Korean Appln. No. 2020-0109160, dated Feb. 11, 2021, 21 pages (with English translation).

Extended European Search Report in European Appln. No. 21169778.4, dated Oct. 15, 2021, 5 pages.

Extended European Search Report in European Appln. No. 21169793.3, dated Oct. 15, 2021, 4 pages.

Extended European Search Report in European Appln. No. 21169796.6, dated Oct. 18, 2021, 4 pages.

Extended European Search Report in European Appln. No. 21169813.9, dated Oct. 20, 2021, 4 pages.

Extended European Search Report in European Appln. No. 21169817.0, dated Oct. 14, 2021, 4 pages.

Extended European Search Report in European Appln. No. 21170476.2, dated Oct. 13, 2021, 4 pages.

Extended European Search Report in European Appln. No. 21170861.5, dated Oct. 25, 2021, 4 pages.

Notice of Allowance in Japanese Appln. No. 2020-204668, dated Aug. 16, 2022, 5 pages (with English translation).

Office Action in Chinese Appln. No. 202110552518.6, dated Jul. 4, 2022, 18 pages (with English translation).

Notice of Allowance in Korean Appln. No. 10-2020-0068413, dated May 31, 2022, 4 pages (with English translation).

Notice of Allowance in Korean Appln. No. 10-2020-0080087, dated Jun. 30, 2022, 5 pages (with English translation).

Office Action in Chinese Appln. No. 202011328161.5, dated Apr. 2, 2022, 15 pages (with English translation).

Office Action in Chinese Appln. No. 202110046911.8, dated Apr. 15, 2022, 12 pages (with English translation).

(56) References Cited

OTHER PUBLICATIONS

Office Action in Chinese Appln. No. 202110382635.2, dated Apr. 20, 2022, 12 pages (with English translation).
Office Action in Chinese Appln. No. 202110383659.X, dated Apr. 18, 2022, 13 pages (with English translation).
Office Action in Chinese Appln. No. 202110404827.9, dated Apr. 19, 2022, 13 pages (with English translation).
Office Action in Indian Appln. No. 202114011936, dated May 5, 2022, 5 pages.
Office Action in Japanese Appln. No. 2021-043251, dated May 10, 2022, 6 pages (with English translation).
Office Action in Japanese Appln. No. 2021-073811, dated May 10, 2022, 6 pages (with English translation).
Office Action in Japanese Appln. No. 2021-074825, dated Apr. 19, 2022, 6 pages (with English translation).
Office Action in Japanese Appln. No. 2021-090930, dated Jun. 14, 2022, 10 pages (with English translation).
Office Action in Chinese Appln. No. 202011089763, mailed on Feb. 11, 2023, 18 pages (with English translation).
Office Action in Chinese Appln. No. 202011328031, mailed on Feb. 15, 2023, 18 pages (with English translation).
Office Action in Chinese Appln. No. 202110184702, mailed on Mar. 18, 2023, 23 pages (with English translation).
Office Action in Korean Appln. No. 20210129533, mailed on Mar. 28, 2023, 18 pages (with English translation).
Office Action in Korean Appln. No. 20220126062, mailed on Mar. 23, 2023, 23 pages (with English translation).
Office Action in U.S. Appl. No. 17/170,035, filed Feb. 8, 2023, 8 pages.
Korean Office Action in Korean Appln. No. 10-2020-0068402, dated Oct. 15, 2020, 20 pages (with English translation).
Extended European Search Report in European Appln. No. 21169773.5, dated Sep. 24, 2021, 4 pages.
Extended European Search Report in European Appln. No. 21169777.6, dated Sep. 24, 2021, 5 pages.
Office Action in Taiwanese Appln. No. 11120021940, dated Dec. 20, 2020, 11 pages (with English translation).
Notice of Allowance in Korean Appln. No. 10-2020-0068407, dated Nov. 29, 2021, 4 pages (with English translation).
Office Action in Korean Appln. No. 10-2020-0068400, dated Dec. 27, 2021, 13 pages (with English translation).
Office Action in Korean Appln. No. 10-2020-0068412, dated Dec. 27, 2021, 15 pages (with English translation).
Office Action in Korean Appln. No. 10-2020-0080417, dated Dec. 28, 2021, 13 pages (with English translation).
Office Action in Korean Appln. No. 10-2020-0089132, dated Dec. 28, 2021, 13 pages (with English translation).
Office Action in Korean Appln. No. 10-2020-0068413, dated Nov. 17, 2021, 13 pages (with English translation).
Office Action in Korean Appln. No. 10-2020-0080087, dated Nov. 30, 2021, 15 pages (with English translation).
Office Action in Indian Appln. No. 202114007027, dated Jan. 5, 2022, 6 pages.
Office Action in Indian Appln. No. 202114003123, dated Jan. 6, 2022, 5 pages.
Office Action in Indian Appln. No. 202114008985, dated Jan. 12, 2022, 5 pages.
Office Action in Indian Appln. No. 202114003125, dated Jan. 13, 2022, 5 pages.
Office Action in Indian Appln. No. 202114007372, dated Jan. 24, 2022, 6 pages.
Decision to Grant a Patent in Japanese Appln. No. 2021-043251, dated Oct. 25, 2022, 5 pages (with English translation).
Office Action in European Appln. No. 20217533.7, dated Nov. 23, 2022, 5 pages.
Office Action in European Appln. No. 21182279.6, dated Oct. 17, 2022, 2 pages.
Office Action in Taiwanese Appln. No. 110117972, dated Oct. 7, 2022, 14 pages (with English translation).
Office Action in U.S. Appl. No. 17/170,035, filed Sep. 29, 2022, 19 pages.
Written Decision on Registration in Korean Appln. No. 10-2020-0080437, dated Oct. 22, 2022, 11 pages (with English translation).
Office Action in U.S. Appl. No. 17/178,103, filed Jun. 30, 2023, 30 pages.
Office Action in Chinese Appln. No. 202110096186.5, mailed on Feb. 9, 2024, 7 pages (with English translation).
Office Action in U.S. Appl. No. 17/121,056, filed Dec. 21, 2023, 10 pages.
Office Action in U.S. Appl. No. 17/121,115, filed Dec. 20, 2023, 11 pages.
Office Action in U.S. Appl. No. 17/174,766, filed Dec. 5, 2023, 12 pages.
Office Action in U.S. Appl. No. 17/231,462, filed Dec. 28, 2023, 17 pages.
Office Action in U.S. Appl. No. 17/231,472, filed Feb. 27, 2024, 20 pages.
Office Action in U.S. Appl. No. 17/244,683, filed Feb. 8, 2024, 14 pages.
Office Action in European Appin. No. 21170861.5, mailed on Dec. 16, 2024, 4 pages.

* cited by examiner

MASK APPARATUS AND METHOD FOR CONTROLLING THE SAME

CROSS-REFERENCE TO RELATED APPLICATIONS

The present application claims the benefits of priority to Korean Patent Application No. 10-2020-0080417, filed on Jun. 30, 2020, the disclosure of which is incorporated herein by reference in its entirety.

TECHNICAL FIELD

The present disclosure relates to a mask apparatus and a method for controlling the same.

BACKGROUND

A mask is a device that can cover a user's nose and mouth to prevent or reduce inhalation of germs and dust or droplet transmitting viruses or bacteria. The mask can be in close contact with the user's face to cover the user's nose and mouth. The mask can filter germs, dust, and the like, which may be contained in the air, and provide filtered air to the user's mouth and nose. Air containing germs and dust may pass through a body of the mask including a filter configured to block the germs and the dust.

In some cases, the mask can cause uncomfortable breathing since air is introduced into the user's nose and mouth and discharged to the outside after passing through the body of the mask. In some cases, a mask can include a motor, a fan, and a filter to help breathing with the mask.

In some examples, a dust mask can include a mask body, a filter formed on the mask body, a motor controlling a flow rate of air introduced through the filter, and a differential sensor measuring a pressure change inside the mask body.

The dust mask can set an operation mode based on a difference in pressure measured from the differential sensor and vary a maximum output or minimum output of the motor according to the set operation mode. Thus, the operation mode can be determined in real time according to a user's breathing state, and the output of the motor can be appropriately controlled according to the determined operation mode to improve wearing environments of the mask.

In some cases, the dust mask simply determines whether the user breathes or talks using the pressure difference in the inner space of the mask, and accordingly, constantly controls an output of the motor, but does not specifically consider the user's breathing state.

For example, the dust mask controls rotation speeds of a fan at the beginning of user's inhalation and the beginning of user's exhalation to be the same, which may lead to uncomfortable breathing when the user actually inhales or exhales. In some cases, when the rotation speed of the fan is high, the inhalation may become easier, but the exhalation may become difficult. When the rotation speed of the fan is slow, the exhalation may become easier, but the inhalation may become difficult.

In some cases, the rotation speed of the fan may not change based on the user's breathing state, and thus an air volume may not be properly provided according to the breathing state.

SUMMARY

The present application describes a mask apparatus that can determine a breathing state of a user by sensing an inner pressure of a mask and a method for controlling the same.

The present application also describes a mask apparatus that can control an inhalation flow rate of external air according to a user's breathing state, and a method for controlling the same.

The present application further describes a mask apparatus that can vary a rotation speed of a fan based on a pressure state inside the mask, and a method for controlling the same.

The present application further describes a mask apparatus that can analyze a user's breathing cycle or pattern of inhalation or exhalation and assist the user's breathing according to the analyzed result, and a method for controlling the same.

According to one aspect of the subject matter described in this application, a mask apparatus includes a mask body, a fan module configured to be coupled to the mask body, a seal that is coupled to a rear surface of the mask body and defines a breathing space therein, a pressure sensor coupled to the mask body and configured to sense an air pressure in the breathing space, a mask body cover coupled to a front surface of the mask body and configured to cover the fan module, and a controller coupled to the mask body and configured to control a rotation speed of the fan module based on the air pressure sensed by the pressure sensor. The controller is configured to determine a first breathing cycle based on a maximum pressure value and a minimum pressure value among a plurality of air pressure values sensed by the pressure sensor, determine a first time difference between a first maximum time point corresponding to the maximum pressure value of the first breathing cycle and a first minimum time point corresponding to the minimum pressure value of the first breathing cycle, determine an expected time point of inhalation in a second breathing cycle based on the first breathing cycle and the first time difference, and increase the rotation speed of the fan module based on a current time corresponding to the expected time point of inhalation.

Implementations according to this aspect can include one or more of the following features. For example, the controller can be configured to operate the fan module at a first speed for a predetermined time based on power being applied to the mask apparatus, and receive a first air pressure sensed by the pressure sensor while operating the fan module at the first speed.

In some implementations, the first breathing cycle can be defined by a period of time between two adjacent time points at which two maximum air pressure values are sensed or at which two minimum air pressure values are sensed. In some implementations, the controller can be configured to vary the expected time point of inhalation in a subsequent breathing cycle based on a current breathing cycle and a current time difference.

In some implementations, the controller can be configured to determine the expected time point of inhalation of the second breathing cycle based on a time point corresponding to 20% to 50% of the first time difference from a time point corresponding to a maximum pressure value of the second breathing cycle. In some examples, the controller can be configured to determine a minimum pressure value of the second breathing cycle, and reduce the rotation speed of the fan module based on the current time corresponding to a time point corresponding to the minimum pressure value of the second breathing cycle.

In some implementations, the controller can be configured to determine a duty ratio of the fan module, the duty ratio being less than a target duty ratio that is determined based on a target rotation speed, and input the duty ratio to the fan module to decrease the rotation speed of the fan module.

In some implementations, the controller can be configured to determine whether a power-off command of the mask apparatus is input. In some examples, the controller can be configured to, based on determining that the power-off command of the mask apparatus is not input, determine a second time difference between a second maximum time point corresponding to a maximum pressure value of the second breathing cycle and a second minimum time point corresponding to a minimum pressure value of the second breathing cycle.

In some implementations, the controller can be configured to determine a duty ratio of the fan module, where the duty ratio is greater than a target duty ratio that is determined based on a target rotation speed of the fan module, and input the duty ratio to the fan module to increase the rotation speed of the fan module.

According to another aspect, a method for controlling a mask apparatus includes supplying power to the mask apparatus to operate a pressure sensor of the mask apparatus, sensing, by the pressure sensor, an air pressure in a breathing space that is defined in the mask apparatus, receiving, by a controller of the mask apparatus, a plurality of pressure values sensed by the pressure sensor, determining a first breathing cycle based on a maximum pressure value and a minimum pressure value among the plurality of pressure values sensed by the pressure sensor, determining a first time difference between a first maximum time point corresponding to the maximum pressure value of the first breathing cycle and a first minimum time point corresponding to the minimum pressure value of the first breathing cycle, determining an expected time point of inhalation in a second breathing cycle based on the first breathing cycle and the first time difference, and controlling a rotation speed of a fan module of the mask apparatus. The controlling of the rotation speed of the fan module includes increasing the rotation speed of the fan module based on a current time corresponding to the expected time point of inhalation.

Implementations according to this aspect can include one or more of the following features or the features of the mask apparatus described above. For example, the method can include, based on power being applied to the mask apparatus, operating the fan module at a first speed for a predetermined time, and transmitting, to the controller, a first pressure value sensed by the pressure sensor while operating the fan module at the first speed.

In some implementations, the first breathing cycle can be determined based on a period of time between two adjacent time points at which two maximum air pressure values are sensed or at which two minimum air pressure values are sensed. In some implementations, the method can include varying the expected time point of inhalation of a subsequent breathing cycle based on a current breathing cycle and a current time difference.

In some implementations, the expected time point of inhalation can be determined based on a time point corresponding to 20% to 50% of the first time difference from a time point corresponding to a maximum pressure value of the second breathing cycle. For example, the expected time point of inhalation can be equal to any one time point corresponding to 20% to 50% of the first time difference from the time point corresponding to a maximum pressure value of the second breathing cycle.

In some implementations, the method can include determining a minimum pressure value of the second breathing cycle, and decreasing the rotation speed of the fan module at a second minimum time point corresponding to the minimum pressure value of the second breathing cycle.

In some implementations, the method can include determining a duty ratio of the fan module, where the duty ratio is less than a target duty ratio determined based on a target rotation speed of the fan module, and inputting the duty ratio to the fan module to decrease the rotation speed of the fan module.

In some implementations, the method can include determining whether a power-off command of the mask apparatus is input. In some examples, the method can include, based on determining that the power-off command of the mask apparatus is not input, determining a second time difference between a second maximum time point corresponding to a maximum pressure value of the second breathing cycle and a second minimum time point corresponding to a minimum pressure value of the second breathing cycle.

In some implementations, the method can include determining a duty ratio of the fan module, the duty ratio being greater than a target duty ratio determined on a target rotation speed of the fan module, and inputting the duty ratio to the fan module to increase the rotation speed of the fan module.

In some implementations, the user's breathing state including inhalation and exhalation can be determined according to the pressure inside the mask, and the rotation speed of the fan module can be varied based on the determined information. The flow rate of inhalation of external air can be appropriately provided during the breathing. Therefore, there can be the advantage that the breathing can be easier for a user wearing the mask apparatus.

In some implementations, the pressure change value caused by the fan driving can be estimated to be reflected to the sensed value of the pressure sensor, thereby accurately sensing the pressure of the mask.

In some implementations, the duty ratio input to the pulse of the fan motor can be adequately adjusted to allow the user's breathing to be smoother.

DETAILED DESCRIPTION

Figure 1:
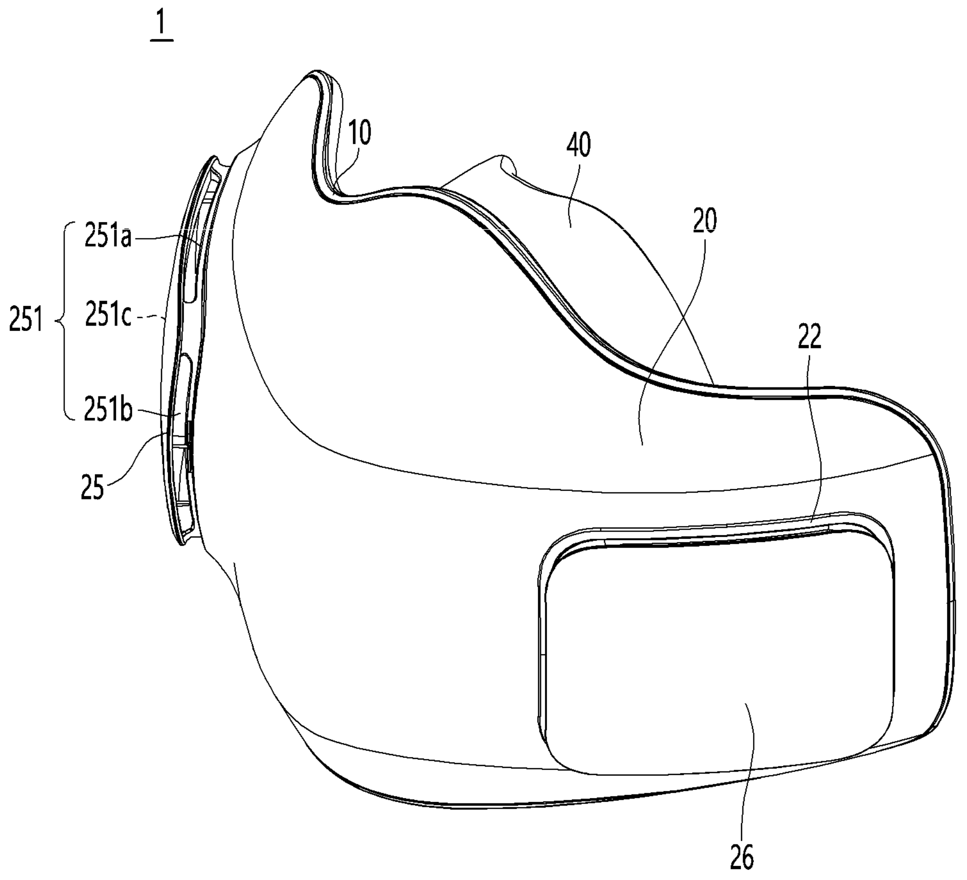
FIG. 1 is a left perspective view showing an example of a mask apparatus.
Figure 2:
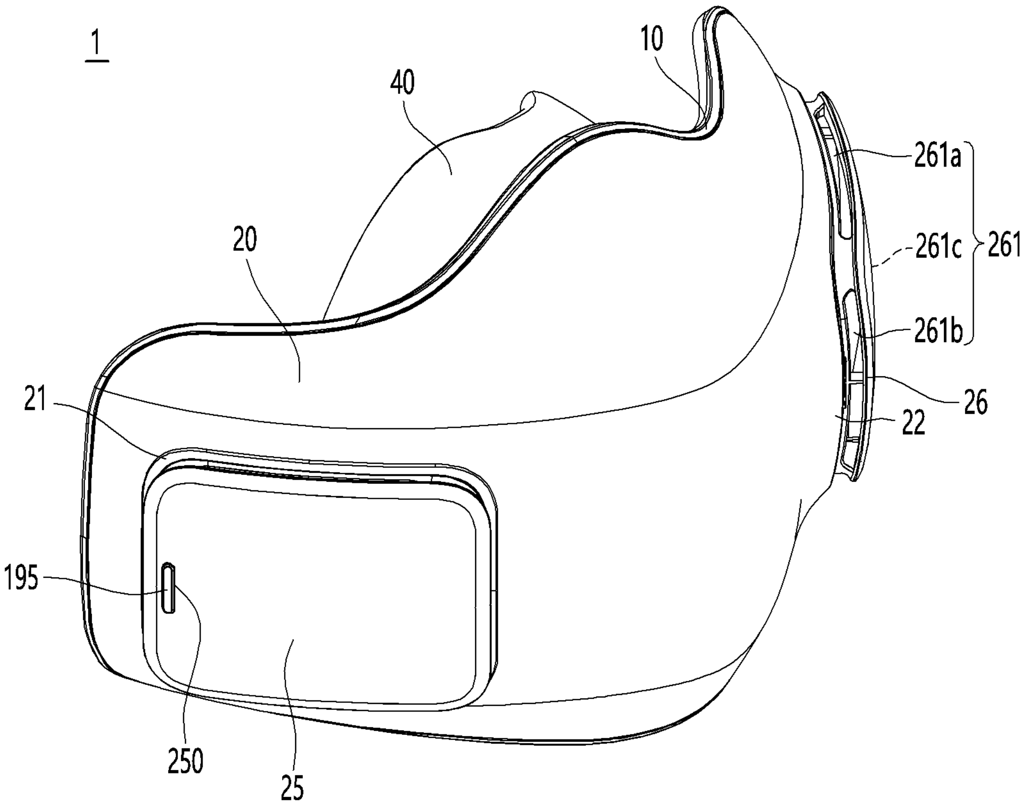
FIG. 2 is a right perspective view showing the mask apparatus.
Figure 3:
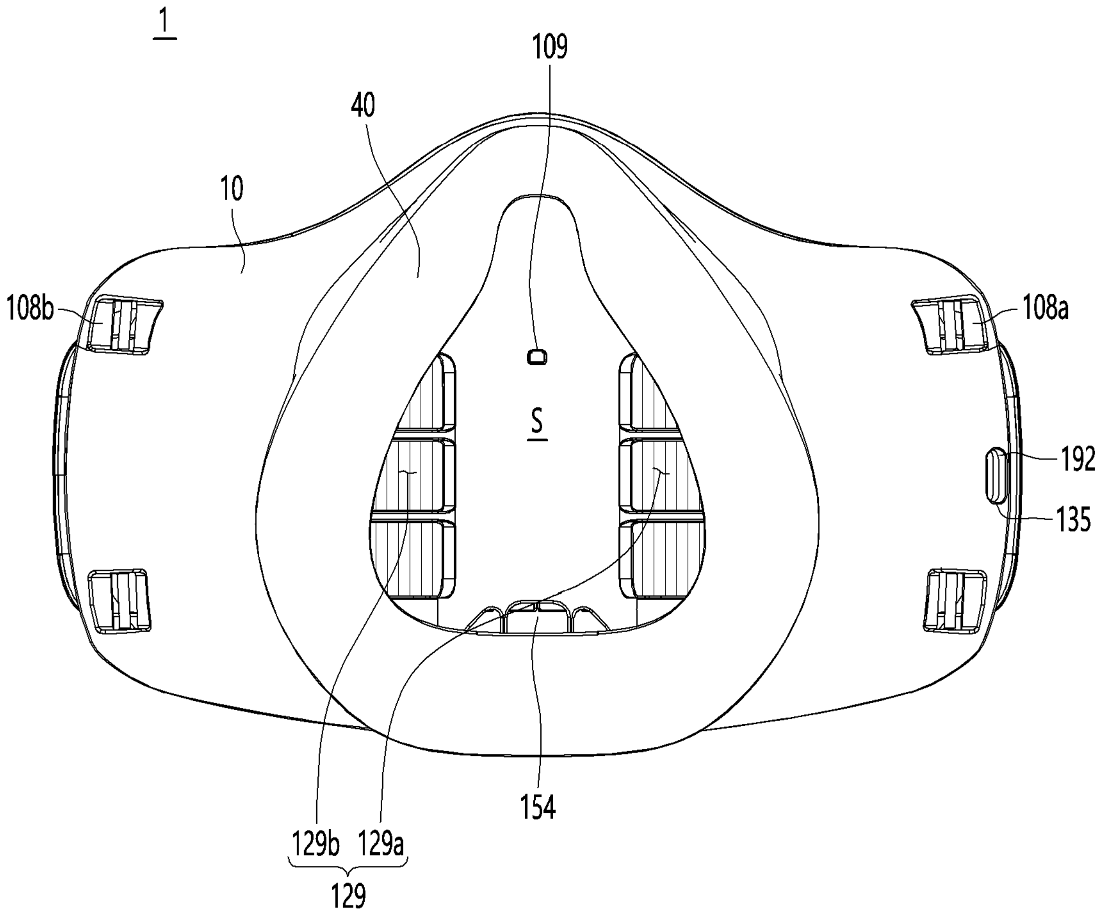
FIG. 3 is a rear view showing the mask apparatus.
Figure 4:
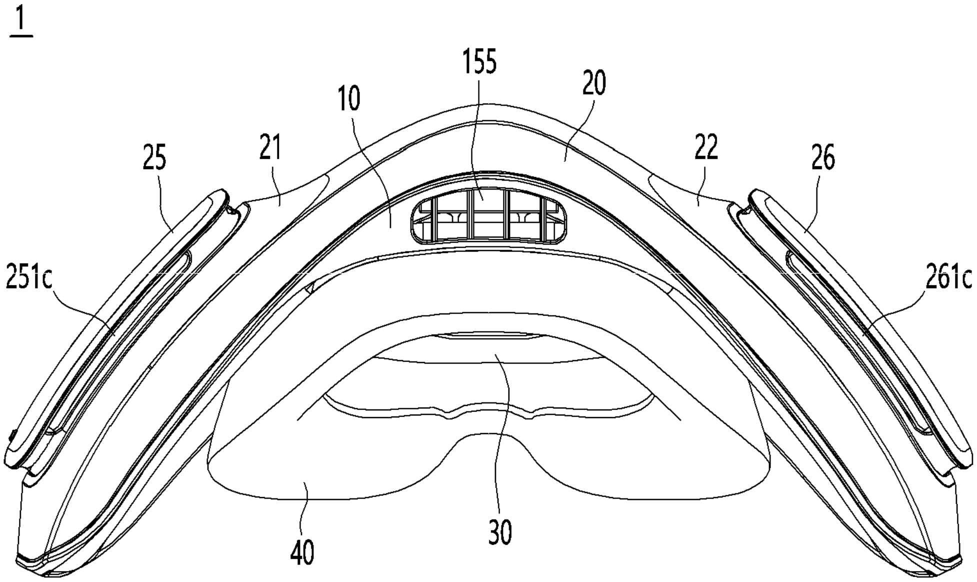
FIG. 4 is a bottom view showing the mask apparatus.

FIG. 1 is a left perspective view showing an example of a mask apparatus, FIG. 2 is a right perspective view showing the mask apparatus, FIG. 3 is a rear view showing the mask apparatus, and FIG. 4 is a bottom view showing the mask apparatus.

Referring to FIGS. 1 to 4, a mask apparatus 1 can include a mask body 10 and a mask body cover 20 coupled to the mask body 10.

The mask body 10 and the mask body cover 20 can be detachably coupled to each other. When the mask body 10 and the mask body cover 20 are coupled to each other, an inner space can be defined between the mask body 10 and the mask body cover 20. Constituents for driving the mask apparatus 1 can be disposed in the inner space. The inner space can be defined between a front surface of the mask body 10 and a rear surface of the mask body cover 20. The mask body 10 can define a rear surface of the mask apparatus 1, and the mask body cover 20 can define a front surface of the mask apparatus 1.

A rear side of the mask apparatus 1 is defined as a direction in which the rear surface of the mask apparatus 1 facing a user's face is disposed, and a front side of the mask apparatus 1 is defined as a direction which is opposite to the rear side and in which a front surface of the mask apparatus 1, which is exposed to the outside, is disposed.

In some implementations, the mask apparatus 1 can further include a sealing bracket 30 and a seal 40 that is detachably coupled to the sealing bracket 30.

The sealing bracket 30 can be detachably coupled to a rear surface of the mask body 10 to fix the seal 40 to the rear surface of the mask body 10. In some examples, when the sealing bracket 30 is separated from the rear surface of the mask body 10, the seal 40 can be separated from the mask body 10.

The seal 40 can be supported on the rear surface of the mask body 10 by the sealing bracket 30, and a breathing space S for breathing can be defined between the seal 40 and the rear surface of the mask body 10. The seal 40 can be in close contact with a user's face and can surround user's nose and mouth to restrict introduction of external air into the breathing space S.

The mask body cover 20 can include a first filter mounting portion 21 and a second filter mounting portion 22. The first filter mounting portion 21 can be disposed at a right side of the mask body cover 20, and the second filter mounting portion 22 can be disposed at a left side of the mask body cover 20.

A left direction (left side) and a right direction (right side) are defined based on the mask apparatus 1 worn on the user's face. That is, in the state in which the user wearing the mask apparatus 1, a right side of the user is defined as the right side of the mask apparatus 1, and a left side of the user is defined as the left side of the mask apparatus 1.

In some examples, an upward direction (upward side) and a downward direction (downward side) are defined based on the mask apparatus 1 mounted on the user's face.

A first filter cover 25 can be mounted on the first filter mounting portion 21, and a second filter cover 26 can be mounted on the second filter mounting portion 22. Filters 23 and (see FIG. 5) can be disposed inside the first filter mounting portion 21 and the second filter mounting portion 22, and the first filter cover 25 and the second filter cover 26 can cover the filter.

The first filter cover 25 and the second filter cover 26 can be detachably coupled to the first filter mounting portion 21 and the second filter mounting portion 22, respectively. For example, the first filter cover 25 and the second filter cover 26 can be coupled to be fitted into the first filter mounting portion 21 and the second filter mounting portion 22, respectively.

Each of the first filter cover 25 and the second filter cover 26 can include a front surface portion and side surface portions extending backward along an edge of the front surface portion or an edge of a rear surface.

Each of the side surface portions of the first filter cover 25 and the second filter cover 26 can have four side surfaces, and the four side surfaces can include an upper side surface, a lower side surface, a left side surface, and a right side surface.

One or a plurality of first air inlets 251 can be defined in the side surface portion of the first filter cover 25. One or a plurality of second air inlets 261 can also be defined in the side surface portion of the second filter cover 26.

In the state in which the first filter cover 25 is mounted on the first filter mounting portion 21, the first air inlet 251 can be defined to be exposed to the outside. In the state in which the second filter cover 26 is mounted on the second filter mounting portion 22, the second air inlet 261 can be defined to be exposed to the outside.

The first air inlet 251 and the second air inlet 261 can be defined in the side surfaces of the first filter cover 25 and the second filter cover 26, respectively. In some implementations, each of the first and second air inlets 251 and 261 are respectively defined in the front surface portions of the first and second filter covers 25 and 26.

The first air inlet 251 and the second air inlet 261 can be defined at a point closer to the front surface portion from a line that bisects the side surface portion.

When a plurality of the first air inlets 251 are provided in the side surface portions of the first filter cover 25, the first air inlets 251 can include a first air suction hole **251*a* defined in the right side surface, a second air suction hole 251*b* defined in the left side surface, and a third air suction hole 251*c*** defined in the upper side surface.

Similarly, when a plurality of the second air inlets 261 are provided in the side surface portions of the second filter cover 26, the second air inlets 261 can include a first air suction hole **261*a* defined in the left side surface, a second air suction hole 261*b* defined in the right side surface, and a third air suction hole 261*c*** defined in the upper side surface.

An opening 250 can be defined in one of the first filter cover 25 and the second filter cover 26, and the opening 250 can be defined in an edge of one of the first filter cover 25 and the second filter cover 26. In some examples, a manipulation portion 195 for controlling an operation of the mask apparatus 1 can be mounted in the opening 250. In some implementations, the manipulation portion 195 is mounted on the first filter cover 25 as an example.

The manipulation portion 195 can serve as a manipulation switch that turns on/off power of the mask apparatus 1. The manipulation portion 195 can be exposed to the front side of the mask apparatus 1 while being mounted in the opening 250.

The mask body 10 can include a hook mounting portion 108. The hook mounting portion 108 can be provided on the left and right sides of the mask body 10.

That is, the hook mounting portion 108 can include a first hook mounting portion **108*a* provided at a right side of the mask body 10, and a second hook mounting portion 108*b* provided at a left side of the mask body 10**.

Each of the first hook mounting portion **108*a* and the second hook mounting portion 108*b* can be provided in plurality to be spaced apart from each other in a vertical direction of the mask body 10. In detail, the first hook mounting portion 108***a* can be provided at each of the upper right and lower right sides of the mask body 10, and the second hook mounting portion 108*b* can be provided at each of the upper left and lower left sides of the mask body 10.

A band for maintaining the mask apparatus 1 in close contact with the user's face can be mounted on the hook mounting portion 108.

For example, both ends of the band can connect the first hook mounting portion 108*a* to the second hook mounting portion 108*b* or connect each of two first hook mounting portions 108*a* spaced apart from each other in the vertical direction to each of two second hook mounting portions 108*b* spaced apart from each other in the vertical direction to each other.

In the former case, the band can have a shape surrounding the user's occipital region, and in the latter case, the band can have a shape that is hooked on both ears of the user.

The hook mounting portion 108 can be formed by cutting a portion of the mask body 10. Thus, air can be introduced into the inner space between the mask body 10 and the mask body cover 20 through a gap defined in the hook mounting portion 108.

In detail, the external air introduced into the inner space through the hook mounting portion 108 can cool electronic components disposed in the inner space. In some examples, the air of which a temperature increases while cooling the electronic components can be discharged again to the outside of the mask body 10 through the hook mounting portion 108. In some examples, to restrict a flow of the air introduced into the inner space through the hook mounting portion 108 into the breathing space, the inside of the mask apparatus 1 can have a sealing structure.

The mask body 10 can include an air outlet 129 for supplying the filtered air to the breathing space. The user can breathe while breathing the filtered air supplied through the air outlet 129 to the breathing space.

The air outlet 129 can include a first air outlet 129*a* through which the filtered air introduced into the first air inlet 251 is discharged to the breathing space S and a second air outlet 129*b* through which the filtered air introduced into the second air inlet 261 is discharged to the breathing space S.

The first air outlet 129*a* can be defined at a right side with respect to a center of the mask body 10, and the second air outlet 129*b* can be defined at a left side with respect to the center of the mask body 10. The air introduced through the first air inlet 251 can pass through the filter 23 and then flow to the first air outlet 129*a*. The air introduced through the second air inlet 261 can pass through the filter 24 and then flow to the second air outlet 129*b*.

The mask body 10 can include air exhaust holes 154 and 155 for discharging air exhaled by the user to an external space. The air exhaust holes 154 and 155 can be defined in a lower portion the mask body 10.

The air exhaust holes 154 and 155 can include a first air exhaust hole 154 defined in a front lower end of the mask body 10 and a second air exhaust hole 155 defined in a bottom surface of the mask body 10.

In detail, a rib extending forward can be formed at the front lower end of the mask body 10, and a surface defined by the rib can be defined as the bottom surface of the mask body 10.

A flow space through the air flowing toward the second air exhaust hole 155 by passing through the first air exhaust hole 154 descends can be defined between the mask body 10 and the mask body cover 20.

A check valve can be provided in one or more of the first air exhaust hole 154 and the second air exhaust hole 155. The external air can be introduced into the breathing space, while the check valve restrict back flow of the air discharged through the second air exhaust hole 155. The check valve can be disposed in the flow space between the first air exhaust hole 154 and the second air exhaust hole 155.

For example, the check valve having the form of a flat flap with a size and shape corresponding to the size and shape of the first air exhaust hole 154 can be provided.

In detail, an upper end of the flap can be connected to an upper edge of the first air exhaust hole 154, and when the user exhales, the flap can be bent or rotates to open the first air exhaust hole 154, and when the user inhales, the flap can be in close contact with the first air exhaust hole 154 to prevent the external air or the discharged air from being introduced again into the breathing space.

The mask body 10 can include a sensor mounting portion 109. The sensor mounting portion 109 can be equipped with a sensor for acquiring various pieces of information from the breathing space. The sensor mounting portion 109 can be disposed above the mask body 10. When the user breathes, the sensor mounting portion 109 can be disposed above the mask body 10 in consideration of a position at which a pressure change in the breathing space is constantly sensed.

The mask body 10 can include a connector hole 135. The connector hole 135 can be understood as an opening in which a connector 192 for supplying power to the mask apparatus 1 is installed. The connector hole 135 can be defined at either a left edge or a right edge of the mask body 10.

In some implementations, since the manipulation portion 195 and the connector 192 are connected to a power module 19 (see FIG. 5) to be described later, the connector hole 135 can be provided at one side of the left or the right side of the mask body 10, which corresponds to the position at which the power module 19 is installed.

Hereinafter, constituents of the mask apparatus 1 will be described in detail based on an exploded perspective view.

Figure 5:
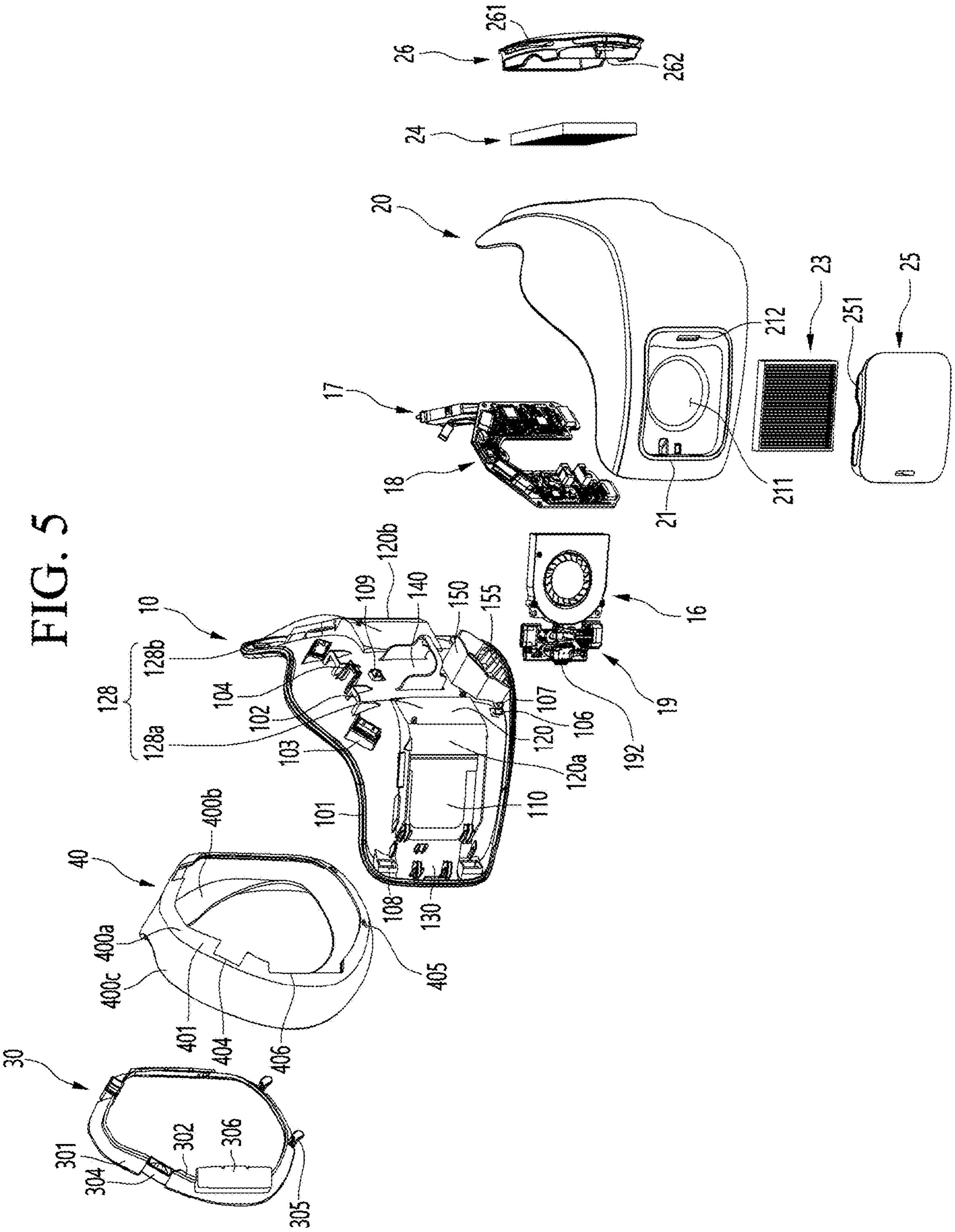
FIG. 5 is an exploded perspective view showing the mask apparatus.

FIG. 5 is an exploded perspective view of the mask apparatus.

Referring to FIG. 5, the mask apparatus 1 can include the mask body 10, the mask body cover 20, the sealing bracket 30, and the seal 40.

In detail, the mask body 10 and the mask body cover 20 can be coupled to each other to form an outer appearance of the mask apparatus 1.

An inner space for accommodating components for the operation of the mask apparatus 1 can be defined between the mask body 10 and the mask body cover 20. The sealing bracket 30 and the seal 40 can be coupled to the rear surface of the mask body 10 to define the breathing space between the user's face and the mask body 10. The sealing bracket 30 and the seal 40 can help to prevent the external air from being introduced into the breathing space.

The mask body 10 can include a cover coupling groove 101. The cover coupling groove 101 can be defined along a front edge of the mask body 10. The cover coupling groove 101 can be defined by a height difference. The cover coupling groove 101 can be defined to correspond to an edge of the mask body cover 20. The cover coupling groove 101 can be defined by recessing a portion of the front surface of the mask body 10 backward. The mask body cover 20 can move toward the cover coupling groove 101 of the mask body 10 to allow the mask body cover 20 to be inserted into the cover coupling groove 101.

The mask body 10 can include a first cover coupling portion 102. An upper portion of the mask body cover 20 can be supported on the first cover coupling portion 102. The first cover coupling portion 102 can be disposed on a front upper portion of the mask body 10.

For example, the first cover coupling portion 102 can have a structure that is capable of being hook-coupled. The hook coupled to the first cover coupling portion 102 can be disposed on a rear surface of the mask body cover 20.

The first cover coupling portion 102 can be provided in plurality, and the hook can also be provided in plurality to correspond to the first cover coupling portions 102. In some implementations, the first cover coupling portion 102 can be provided at the left and right sides of the mask body 10 based on the center of the mask body 10, respectively. The first cover coupling portion 102 can be referred to as an upper cover coupling portion.

The mask body 10 can include a first bracket coupling portion 103. The first bracket coupling portion 103 can be disposed above the mask body 10. The first bracket coupling portion 103 can support an upper portion of the sealing bracket 30.

The first bracket coupling portion 103 can be disposed above a rear surface of the mask body 10.

For example, the first bracket coupling portion 103 can be provided by allowing a portion constituting the mask body 10 to protruding forward from the rear surface of the mask body 10. Thus, the first bracket coupling portion 103 can be understood as a recess when viewed from a rear side of the mask body 10 and a protrusion when viewed from a front side of the mask body 10.

The sealing bracket 30 can include a first body coupling portion 304 that has the same shape as the recessed shape of the first bracket coupling portion 103 and is seated on the first bracket coupling portion 103.

The first bracket coupling portion 103 can be provided at each of the left and right sides of the mask body 10. The first bracket coupling portion 103 can be defined as an upper bracket coupling portion.

The mask body 10 can include a support rib 104.

The support rib 104 can be provided to protrude forward from the front surface of the mask body 10. The support rib 104 can contact the rear surface of the mask body cover 20 when the mask body cover 20 is coupled to the mask body 10.

The mask body 10 and the mask body cover 20 can resist external forces acting in a front and rear direction by the support rib 104. The support ribs 104 can be provided in a plurality on the front surface of the mask body 10.

The support rib 104 can perform a function of fixing a portion of the control module 18 mounted on the mask body 10. For this, the support rib 104 can include a hook shape. In other words, a hook protrusion can protrude from an end of the support rib 104 to fix the end of the control module 18.

The mask body 10 can include a second cover coupling portion 106.

A lower portion of the mask body cover 20 can be supported on the second cover coupling portion 106. The second cover coupling portion 106 can protrude in a hook shape from a front lower end of the mask body 10. The first cover coupling portion 106 can be provided at each of the left and right sides of the mask body 10 based on the center of the mask body 10. The second cover coupling portion 106 can be defined as a lower cover coupling portion.

A hook hooking portion to which the second cover coupling portion 106 is coupled can be disposed on the mask body cover 20, and the hook hooking portion can be disposed at each of left and right sides of the mask body cover 20.

The mask body 10 can include a second bracket coupling portion 107.

A lower portion of the sealing bracket 30 can be supported on the second bracket coupling portion 107. The second bracket coupling portion 107 can be provided by opening the mask body 10. The second bracket coupling portion 107 can be disposed in a lower portion of the mask body 10. For example, the second bracket coupling portion 107 can be provided as a through-hole defined in the mask body 10.

A second body coupling portion 305 coupled to the second bracket coupling portion 107 can be disposed on the sealing bracket 30. The second bracket coupling portion 107 can be provided in plurality, and the second body coupling portion 305 can also be provided in plurality to correspond to the second bracket coupling portions 107. In some implementations, the second bracket coupling portion 107 can be provided at each of the left and right sides with respect to the center of the mask body 10. The second bracket coupling portion 107 can be defined as a lower bracket coupling portion.

The mask body 10 can include the above-described sensor mounting portion 109.

The sensor mounting portion 109 can have a rib shape in which a portion of the front surface of the mask body 10 protrudes forward. In detail, the sensor mounting portion 109 has a rib shape that is surrounded along an edge of the sensor, and an installation space in which the sensor is installed is defined in the sensor mounting portion 109.

A hole through which the installation space and the breathing space communicate with each other is defined in the mask body 10 corresponding to the inside of the sensor mounting portion 109. The sensor disposed in the installation space can include a pressure sensor, and the pressure sensor can sense pressure information of the breathing space through the hole.

The mask body 10 can include a fan module mounting portion 110.

The fan module mounting portion 110 can include a first fan module mounting portion on which a first fan module 16 is mounted and a second fan module mounting portion on which a second fan module 17 is mounted.

The first fan module mounting portion and the second fan module mounting portion can be disposed on the front surface of the mask body 10. In detail, the first fan module mounting portion can be disposed at the right side of the mask body 10, and the second fan module mounting portion can be disposed at the left side of the mask body 10.

The first fan module 16 and the second fan module 17 can be detachably coupled to the first fan module mounting portion and the second fan module mounting portion, respectively.

The mask body 10 can include an air duct 120.

The air duct 120 can be disposed on the front surface of the mask body 10. A passage through which air passes can be provided in the air duct 120.

The air duct 120 can include a first air duct 120*a* connected to the first fan module mounting portion and a second air duct 120*b* connected to the second fan module mounting portion.

The first air duct and the second air duct can be disposed on an edge of the first fan module mounting portion and an edge of the second fan module mounting portion, which are adjacent to the center of the front surface of the mask body

10 so as to be disposed between the first fan module mounting portion and the second fan module mounting portion.

In some examples, the first fan module mounting portion and the second fan module mounting portion can have a shape symmetrical with respect to a vertical plane (or a vertical line) passing through the center of the front surface of the mask body 10. Similarly, the first air duct and the second air duct can also have a shape symmetrical with respect to the vertical plane or the vertical line passing through the center of the front surface of the mask body 10.

One end of the air duct 120 communicates with the outlets of the fan modules 16 and 17 to allow the external air to be introduced into the air duct 120. In addition, the other end of the air duct 120 communicates with the air outlet 129 so that the air introduced into the air duct 120 is discharged into the breathing space S.

A control module 18 can be mounted on the front surface of the air duct 120.

A control module mounting portion 128 for mounting the control module 18 can be disposed on the front surface of the air duct 120. A portion of the front surface of the air duct 120 can be provided as a flat portion on which the control module 18 is capable of being seated, and the flat portion can be defined as the control module mounting portion 128.

The control module mounting portion 128 can include a first control module mounting portion 128*a* provided in the first air duct and a second control module mounting portion 128*b* provided in the second air duct. One control module 18 can be fixed to the first control module mounting portion 128*a* and the second control module mounting portion 128*b*, or a plurality of control modules can be respectively fixed to the first and second control module mounting portions 128*a* and 128*b*.

The mask body 10 can include a power module mounting portion 130 for mounting the power module 19.

The power module mounting portion 130 can be disposed on the front surface of the mask body 10. The power module mounting portion 130 can be provided at one of the left and the right side of the mask body 10.

The power module mounting portion 130 can be disposed at the side of the fan module mounting portion 110. Specifically, the power module mounting portion 130 can be provided between the fan module mounting portion 110 and a side end of the mask body 10. The side end of the mask body 10 can be defined as an end adjacent to the user's ear when worn. In some examples, a connector hole 135 can be defined in the side end of the mask body 10 provided with the power module mounting portion 130.

The mask body 10 can include a battery mounting portion 140 for mounting a battery.

The battery mounting portion 140 can be disposed on the front surface of the mask body 10. The battery mounting portion 140 can be provided to protrude forward from the front surface of the mask body 10 so as to surround the battery.

For example, the battery mounting portion 140 can include a pair of guide ribs protruding forward from the front surface of the mask body 10 and a connection rib connecting front ends of the pair of guide ribs to each other. In some examples, the battery can be mounted in a battery accommodation space defined by the pair of guide ribs and the connection rib.

The battery can move downward from an upper side of the battery accommodating space and be inserted into the battery accommodating space and then can move in a reverse direction to be separated. A lower portion of the battery inserted into the battery mounting portion 140 can be supported by an air discharge portion 150 to be described later.

The mask body 10 can include the air discharge portion 150.

The air discharge portion 150 can be disposed in a lower portion of the mask body 10. The air discharge portion 150 can define a flow space through which the air flowing from the first air exhaust hole 154 toward the second air exhaust hole 155 passes.

The air discharge portion 150 can protrude forward from the front surface of the mask body 10. In some examples, the air discharge portion 150 can extend to be rounded in an arch shape or can be bent several times to extend.

When the mask body cover 20 is coupled to the mask body 10, a front end of the air discharge portion 150 can be in contact with the rear surface of the mask body cover 20, and the inner space of the mask body 10 and the flow space can be distinguished from each other. The air discharge portion 150 can define a top surface and both side surfaces of the flow space, and a rear surface of the mask body cover 20 can define a front surface of the flow space. In some examples, the front surface of the mask body 10 can define a rear surface of the flow space, and the bottom surface of the mask body 10 on which the second air exhaust hole 155 is defined can define a bottom surface of the flow space.

The top surface of the air discharge portion 150 can support a lower end of the battery. It is connected to lower ends of both sides of the air discharge portion 150 having the arch shape or tunnel shape can be connected to the bottom surface of the mask body 10, and the bottom surface of the mask body 10 can be defined by the rib extending forward from the lower end of the front surface of the mask body 10. The cover coupling groove 101 is recessed along the front end of the rib defining the bottom surface of the mask body 10, and the lower end of the rear surface of the mask body cover 20 is coupled to the cover coupling groove 101.

The first air exhaust hole 154 can be defined in the front surface of the mask body 10 defining the rear surface of the flow space.

The mask body cover 20 can include a pair of filter mounting portions 21 and 22, as described above.

The filter mounting portions 21 and 22 can be provided by recessing the front surface of the mask body cover 20 to be recessed by a predetermined depth toward the rear surface of the mask body cover 20. Filters 23 and 24 are accommodated inside the filter mounting portions 21 and 22 provided by being recessed, and filter covers 25 and 26 can be mounted on edges of the filter mounting portions 21 and 22 in the state in which the filters 23 and 24 are accommodated.

Air suction ports or holes 211 can be defined in each of the filter mounting portions 21 and 22. The air suction holes 211 can communicate with suction holes defined in the front surfaces of the fan modules 16 and 17, respectively. Each of edges of the air suction holes 211 can have an inclined surface that inclined in a direction in which a diameter gradually decreases from the front surface to the rear surface.

A filter cover mounting groove 212 for fixing each of the filter covers 25 and 26 can be defined in a side surface of each of the filter mounting portions 21 and 22. A coupling protrusion inserted into the filter cover mounting groove 212 can be disposed on each of the filter covers 25 and 26. In FIG. 5, only the coupling protrusion 262 disposed on the left filter cover 26 is illustrated, but the same coupling protrusion can be disposed on the right filter cover 25 as well. A sealing material for sealing can be provided between the edges of the rear surfaces of the air suction holes 211 of the filter mounting portions 21 and 22 and the fan inlets of the fan modules 16 and 17. The sealing material can surround the air suction holes 211 and edges of the fan inlets of the fan modules 16 and 17 to block introduction of external air.

The filter mounting portions 21 and 22 include a first filter mounting portion 21 provided at the right side of the mask body cover 20 and a second filter mounting portion 22 provided at the left side of the mask body cover 20.

The air suction hole defined in the first filter mounting portion 21 can be defined as a first air suction hole 211, and the air suction hole defined in the second filter mounting portion 22 can be defined as a second air suction hole.

The filters 23 and 24 can include a first filter 23 accommodated inside the first filter mounting portion 21 and a second filter 24 accommodated inside the second filter mounting portion 22.

The filter covers 25 and 26 can include a first filter cover 25 mounted on the first filter mounting portion 21 and a second filter cover 26 mounted on the second filter mounting portion 22. A plurality of first air inlets 251 can be defined in the first filter cover 25 to allow the external air to be introduced, and a plurality of second air inlets 261 can be defined in the second filter cover 26 to allow the external air to be introduced.

The control module 18 can be referred to as a first electronic circuit component, and the power module 19 can be referred to as a second electronic circuit component.

The fan modules 16 and 17 can include a fan, a fan motor, and a fan housing accommodating the fan and the fan motor. The fan housing can include a suction hole through which the air is introduced into the fan, and a discharge hole through which the air forcedly flowing by the fan is discharged.

The fan can include various types of fans. For example, the fan can include a centrifugal fan that suctions air from the front side of the mask body cover 20 and discharges the air to the side of the mask body 10. In some examples, the fan can include an axial fan or a cross flow fan.

The air introduced through the first air inlet 251 to pass through the first filter 23 is suctioned through the first air suction hole 211. In some examples, the air introduced through the second air inlet 261 to pass through the second filter 24 is suctioned through the second air suction hole.

The fan outlet of the first fan module 16 can communicate with the first air duct to discharge the air to the breathing space, and the fan outlet of the second fan module 17 can communicate with the second air duct to discharge the air to the breathing space.

The control module 18 can control an operation of the mask apparatus 1. The control module 18 can be fixed to the control module mounting portion 128.

The control module 18 can include a communication module to transmit and receive various types of information. The control module 18 can include a data storage module to store various types of information.

The control module 18 can control an operation of each of the fan modules 16 and 17. In detail, the control module 18 can control the operation of each of the fan modules 16 and 17 based on information sensed from the sensor.

The control module 18 can be electrically connected to the power module 19, the fan modules 16 and 17, and the battery so as to be interlocked with each other.

The power module 19 can receive power from the outside. The power module 19 can include a charging circuit for charging the battery. The power module 19 can include the connector 192 and the manipulation portion 195. Thus, the control module 18 can be operated by receiving battery power or external power through the connector 192.

The power module 19 can control supply of power to the mask apparatus 1 by the manipulation portion 195. In detail, the power module 19 can control supply of power from the battery to the control module 18 and the fan modules 16 and 17.

The seal 40 can be coupled to the rear surface of the mask body 10 by the sealing bracket 30 to be in close contact with the user's face.

The rear surface of the mask body 10 can be to be spaced apart from the user's face by the seal 40.

The sealing bracket 30 can be provided in a ring shape forming a closed loop. The seal 40 can be detachably coupled to the sealing bracket 30.

In some examples, the sealing bracket 30 is coupled to be detachable from the mask body 10 to separate the sealing bracket 30 from the mask body 10. With this structure, only the sealing bracket 30 is separated, or an assembly of the seal 40 and the sealing bracket 30 is separated from the mask body 10 to clean only sealing bracket 30 or clean both the sealing bracket 30 and the seal 40.

After the seal 40 is coupled to the sealing bracket 30, when the sealing bracket 30 is coupled to the mask body 10, the seal 40 is stably fixed to the mask body 10.

The sealing bracket 30 can include a sealing insertion portion 301 inserted into an inner edge of the seal 40.

The inner edge of the seal 40 can be provided in a shape of seal lips that is branched into two portions, and the sealing insertion portion 301 can be inserted into the seal lips.

The sealing insertion portion 301 can have a cross-sectional shape having a constant thickness or a cross-sectional shape of which a thickness decreases from an inner edge toward an outer edge. A body of the sealing bracket 30 can be provided by the sealing insertion portion 301 and a fixing guide 302 to be described later.

The sealing bracket 30 can include the fixing guide 302.

The fixing guide 302 can be bent at an inner end of the sealing insertion portion 301. When the sealing insertion portion 301 is completely inserted into the seal lips of the seal 40, one of the two seal lips is in contact with the fixing guide 302. That is, when the inner edge of the seal 40 is in contact with the fixing guide 302, it is seen that the seal 40 is completely coupled to the sealing bracket 30.

The sealing bracket 30 can include a bracket insertion portion 306 coupled to the mask body 10. The bracket insertion portion 306 is inserted into a cutoff portion defined in the rear surface of the mask body 10 to cover a portion of an edge of the cutoff portion.

The cutoff portion can include an opening communicating with the air duct 120 so that the air passes therethrough. The bracket insertion portion 306 can be disposed on one edge of the cutoff portion, specifically, an outer edge.

The air outlet 129 can be the remaining portion of the cutoff portion that is not covered by the sealing insertion portion 301 in a state in which the bracket insertion portion 306 is inserted into one side of the cutoff portion.

When the bracket insertion portion 306 is inserted into or coupled to the one side of the cutoff portion to shield the one side of the cutoff portion, the air discharged from the fan modules 16 and 17 can pass between the air duct 120 and the bracket insertion portion 306 to flow to the air outlet 129.

The bracket insertion portion 306 can serve as a function of fixing the sealing bracket 30 to the mask body 10 while defining one surface of the air duct 120. In detail, an upper portion of the sealing bracket 30 can be fixed to the upper portion of the mask body 10 by the first body coupling portion 304, a lower portion of the sealing bracket 30 can be fixed to the lower portion of the mask body 10 by the second body coupling portion 305, and an intermediate portion of the sealing bracket 30 can be fixed to an intermediate portion of the mask body 10 by the bracket insertion portion 306.

The seal 40 can be made of a material having elasticity. The seal 40 can be in close contact with the user's face and deformed to correspond to an outline of the user's face. The seal 40 can be provided in a ring shape forming a closed loop. The seal 40 can be provided to cover the user's nose and mouth.

The seal 40 includes a coupling portion 400*a* coupled to the mask body 10, a side surface portion 400*c* extending from the coupling portion 400*a* toward the user's face, and a contact portion 400*b* that is bent from an end of the side surface portion 400*c* to extend toward the coupling portion 400*a*.

The contact portion 400*b* can be a portion that is in close contact with the user's face, and the side surface portion 400*c* and the contact portion 400*b* can be angled at an angle of about 90 degrees or less to define a space between the side surface portion 400*c* and the contact portion 400*b*.

A first opening can be defined inside the coupling portion 400*a* of the seal 40, and a second opening can be defined inside the contact portion 400*b*. As illustrated in FIG. 3, the second opening can include a main opening in which the front of the user's nose and mouth are disposed and a sub opening extending from an upper end of the main opening and disposed on the user's nose.

In some examples, a lower portion of the main opening, that is, a portion that is in close contact with the front of the user's jaw can be designed closer to the mask body 10 than a portion that is in close contact with the front of the user's cheek.

In some examples, a plurality of ventilation holes can be defined in the contact portion 400*b* to minimize a phenomenon in which moisture is generated on the user's cheek. The plurality of ventilation holes can have different sizes, and as an example, a diameter of the ventilation hole can gradually increase from an inner edge to an outer edge of the contact portion 400*b*.

The air outlet 129 and the air exhaust holes 154 and 155 can be provided inside the first opening, and the user's nose and mouth can be disposed inside the second opening.

The seal 40 is disposed between the user's face and the mask body 10, and the breathing space S is defined by the coupling portion 400*a*, the contact portion 400*b*, and the inner side of the side surface portion 400*c* of the seal 40.

A bracket insertion groove 401 can be defined in an end of the coupling portion 400*a* of the seal 40.

The bracket insertion groove 401 can include a groove or a space defined between the two seal lips when the coupling portion 400*a* has the shape that is branched into the two seal lips as described above, and the sealing insertion portion 301 of the sealing bracket 30 is inserted into the bracket insertion groove 401.

The seal 40 includes a first seating portion 404 on which the first body coupling portion 304 is seated, a second seating portion 405 on which the second body coupling portion 305 is seated, and a third seating portion 406 on which the bracket insertion portion 306 is seated.

The first and third seating portions 404 and 406 can include grooves in which a portion of the seal 40 is cut to form an accommodation space in which the first body coupling portion 304 and the bracket insertion portion 306 are accommodated. In some examples, the second seating portion 405 can include a hole in which a portion of the seal 40 is cut to pass through the second body coupling portion 305.

In another aspect, the first seating portion 404 can be defined as a first opening, the second seating portion 405 can be defined as a second opening, and the third seating portion 406 can be defined as a third opening.

Figure 6:
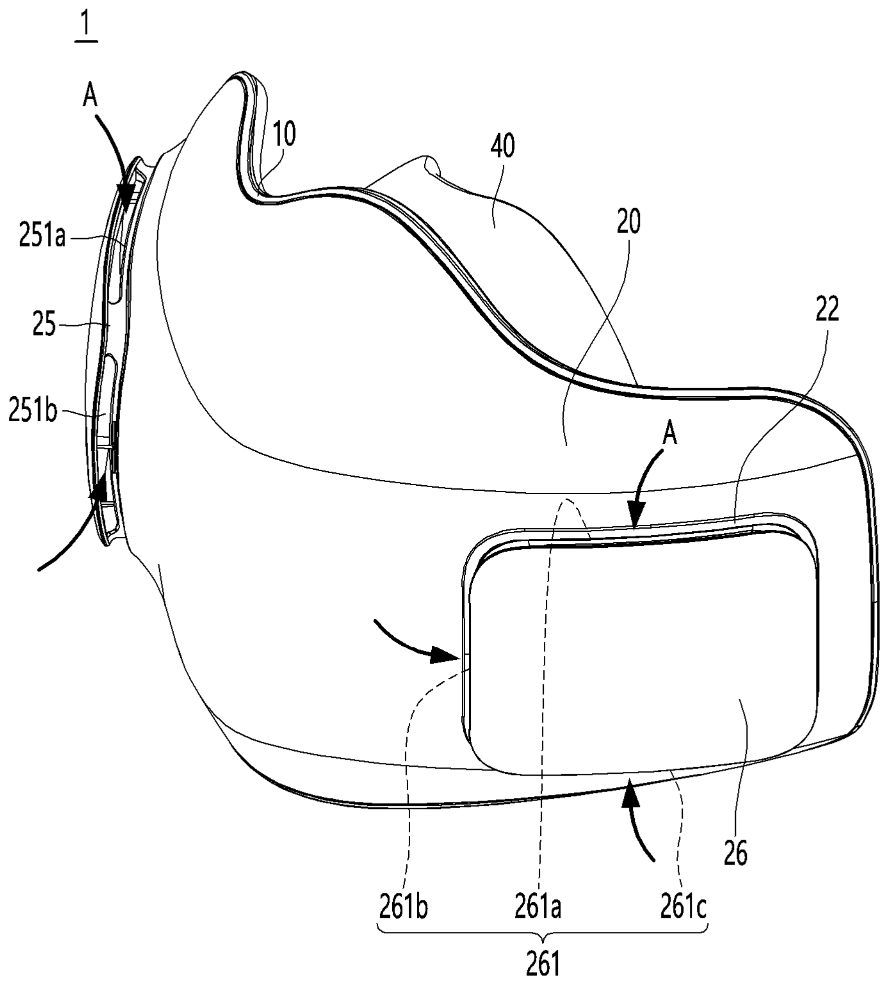
FIGS. 6 and 7 are views illustrating examples of flow of air when the mask apparatus is operated.
Figure 7:
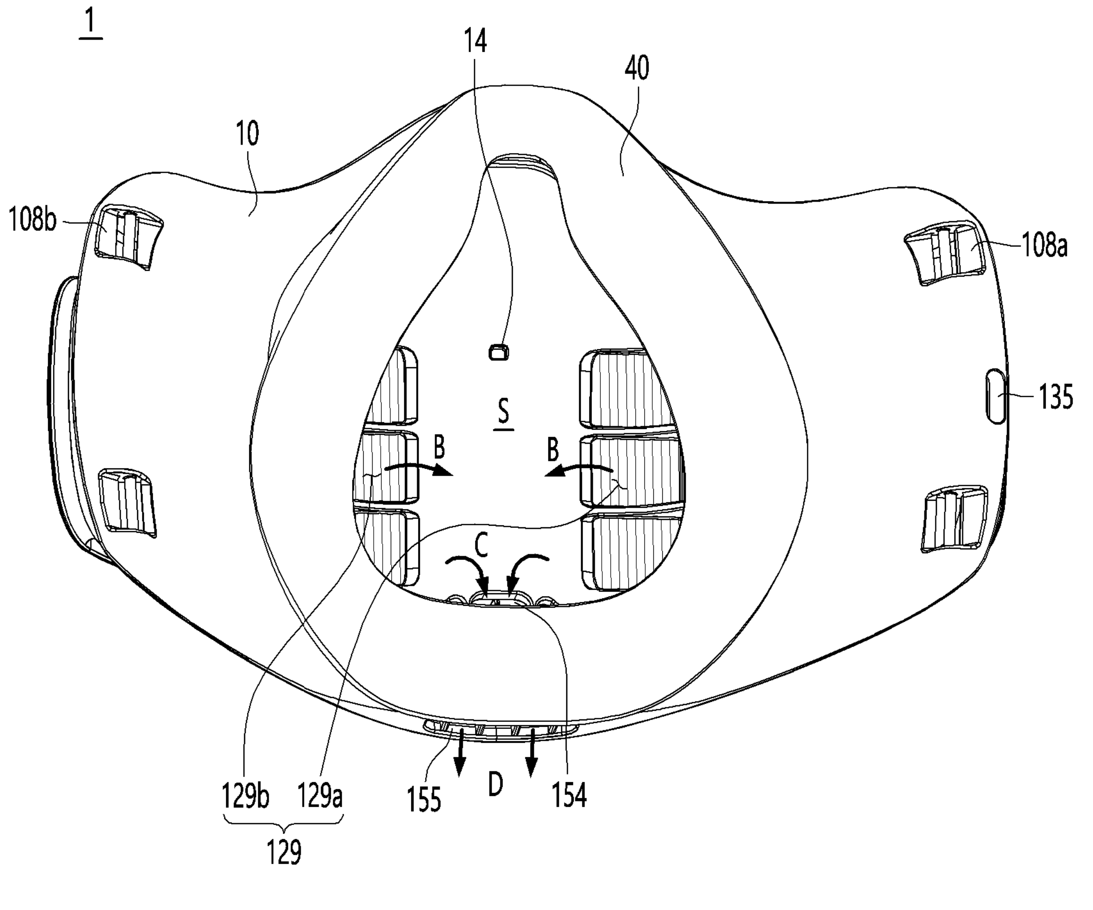

FIGS. 6 and 7 are views illustrating a flow of air when the mask apparatus is operated.

Referring to FIGS. 6 and 7, the mask apparatus 1 can suction the external air through the air inlets 251 and 261 provided in the filter covers 25 and 26. The flow direction of the external air suctioned into the mask apparatus 1 is indicated by an arrow "A" Since the air inlets 251 and 261 are provided in plurality to suction the air in various directions, an inflow rate of the external air increases.

For example, the air inlets 251 and 261 can include air inlets or suction holes 251*a* and 261*a* configured to suction air flowing at upper sides of the filter covers 25 and 26, air inlets 251*b* and 261*b* configured to suction air flowing at a front side of the filter covers 25 and 26, and air inlets 251*c* and 261*c* configured to suction air flowing at a lower side of the filter covers 25 and 26. The side air inlets 251*b* and 261*b* can be provided at one or both sides of the left and right sides of the filter covers 25 and 26.

Since the filter covers 25 and 26 in which the air inlets 251 and 261 are provided are respectively disposed at left and right sides of the front surface of the mask apparatus 1, the external air can be smoothly suctioned from the left and right sides of the front surface of the mask apparatus 1.

The external air introduced through the air inlets 251 and 261 can be filtered by passing through the filters 23 and 24 disposed inside the filter mounting portions 21 and 22. The filters 23 and 24 can be replaced when the filter covers 25 and 26 are separated from the mask apparatus 1.

The air passing through the filters 23 and 24 can be introduced into the suction holes of the fan modules 16 and 17 through the air suction holes 211. In some examples, the filter mounting portions 21 and 22, in which the air suction holes 211 are defined, and the fan modules 16 and 17 can be assembled in the state of being in close contact with each other. Thus, the air can pass through the filter without a leakage, and the external air can may not enter between the filter mounting portions 21 and 22 and the fan modules 16 and 17.

The air discharged through the fan outlets of the fan modules 16 and 17 can pass through the air duct 120 to flow into the breathing space S through the air outlet 129. A flow direction of the air introduced into the breathing space S through the air outlet 129 is indicated by an arrow "B."

The breathing space S can be defined by the mask body 10 and the seal 40. When the mask body 10 is in close contact with the user's face, the seal 40 can be in close contact with the mask body 10 and the user's face to form an independent breathing space that is separated from the external space.

The user inhales after suctioning the filtered air supplied through the air outlet 129 can be exhausted to the external space through the air exhaust holes 154 and 155.

As described above, the air exhaust holes 154 and 155 include a first air exhaust hole 154 communicating with the breathing space and a second air exhaust hole 155 communicating with the external space, and the first air exhaust hole 154 and the second air exhaust hole 155 can communicate with each other by the flow space defined by the air discharge portion 150. The air exhaled by the user can be guided into the flow space through the first air exhaust hole 154. A flow direction of the air flowing into the flow space through the first air exhaust hole 154 is indicated by an arrow "C."

The air guided into the flow space through the first air exhaust hole 154 can be discharged to the external space through the second air exhaust hole 155. A flow direction of the air flowing to the external space through the second air exhaust hole 155 is indicated by an arrow "D."

Figure 8:
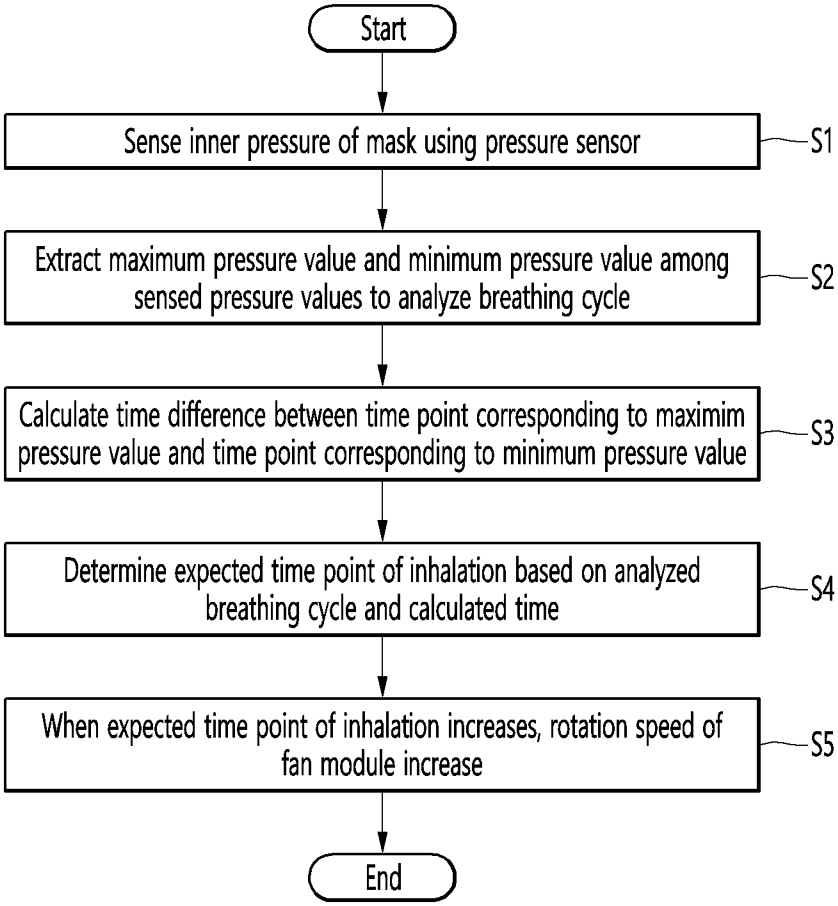
FIG. 8 is a flowchart illustrating an example of a method for controlling a mask apparatus.
Figure 9:
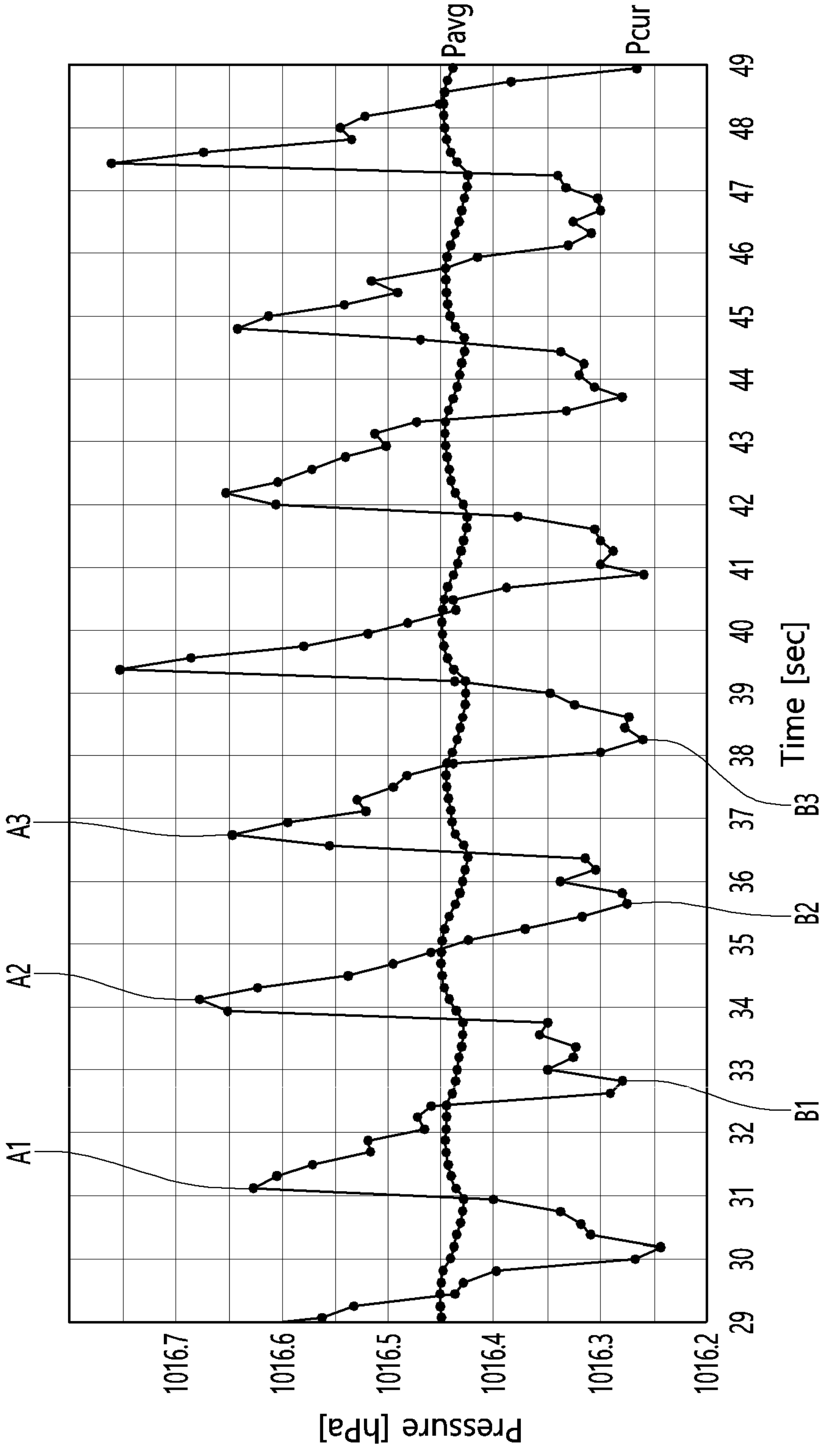
FIG. 9 is a graph illustrating an example of a change of an air pressure in a breathing space, which is sensed by a pressure sensor.

FIG. 8 is a flowchart illustrating an example of a method for controlling the mask apparatus, and FIG. 9 is a graph illustrating an example of a change in pressure of the breathing space, which is sensed by the pressure sensor.

Referring to FIG. 8, in operation S1, a mask apparatus 1, in some implementations, a controller of the mask apparatus 1 senses an inner pressure of a mask by using a pressure sensor 14 (see FIG. 7). The controller can be a control device including a microcomputer mounted on the control module 18. In some examples, the controller can include an electric circuit, one or more processors, or the like, that can control operation of components of the mask apparatus 1 such as the pressure sensor 14 and the fan modules 16 and 17.

Here, the inner pressure of the mask can include an air pressure in a breathing space S defined by a face of a mask wearer and a seal 40.

Here, the pressure sensor 14 can be operated together with an operation of each of fan modules 16 and 17, and each of the fan modules 16 and 17 can rotate at a predetermined RPM to assist that the mask wearer smoothly breathes.

The controller of the mask apparatus 1 can sense a change in inner pressure of the mask for a predetermined time through the pressure sensor 14. The change in pressure sensed by the pressure sensor 14 can be expressed by means of a graph illustrated in FIG. 9.

When the fan modules 16 and 17 are operated, the external air can be suctioned into the fan modules 16 and 17 after passing through filter covers 25 and 26 and filters 23 and 24. In addition, the air suctioned into the fan modules 16 and can be introduced into the breathing space through the air duct 120 and air outlets 129*a* and 129*b*. Then, the user can inhale the air introduced into the breathing space and then exhale the air.

Here, when the user inhales (inhalation) the air supplied to the breathing space, the pressure of the breathing space can decrease while an amount of air in the breathing space decreases. In some examples, when the user exhales (exhalation), the pressure in the breathing space can increase as an amount of air in the breathing space increases.

As described above, the pressure in the breathing space S can decrease or increase depending on a user's breathing state (inhalation or exhalation). In some examples, the pressure in the breathing space can be sensed by the pressure sensor 14. Pressure information sensed by the pressure sensor 14 can be provided to the control module 18 in real time.

In operation S2, the controller of the mask apparatus 1 extracts a maximum pressure value and a minimum pressure value among the pressure values sensed by the pressure sensor 14 to analyze a breathing cycle. For example, the controller can compare a plurality of air pressure values sensed by the pressure sensor 14 and determine a first breathing cycle based on the maximum pressure value and the minimum pressure value among the plurality of air pressure values sensed by the pressure sensor 14.

In some implementations, the mask apparatus 1 extracts information on the user's inhalation and exhalation through pressure data sensed by the pressure sensor 14.

For example, as illustrated in FIG. 9, the mask apparatus 1 collects pressure data sensed by the pressure sensor for a predetermined time. The pressure data can include a pressure value measured in real time, and it can be confirmed that a time taken for one time breath (one time inhalation and one time exhalation), a maximum pressure value and a minimum pressure value for one time breathing cycle and one time breathing from the real-time pressure data.

As described above, when the user inhales air, the air in the breathing space can be introduced into the user's nose so that the pressure in the breathing space gradually decreases, and when the user exhales air, the air can be introduced into the breathing space so that the pressure of the breathing space gradually increases.

As a result, points A1, A2, and A3 at which the pressure of the breathing space is the highest are points at which the exhalation is finished, and points B1, B2, and B3 at which the pressure of the breathing space is the lowest are points at which the inhalation is finished. Therefore, the inhalation starts for a predetermined time from the points A1, A2, and A3 at which the exhalation is finished, and the exhalation starts for a predetermined time from the points B1, B2, and B3 at which the inhalation is finished. According to this principle, the mask apparatus 1 can estimate the user's breathing cycle, i.e., the expected inhalation time points A1, A2, and A3 and the expected exhalation time points B1, B2, and B3.

However, the inhalation does not occur immediately from the time point at which the exhalation is finished. In other words, even though the exhalation is finished, the inhalation does not start immediately, and the inhalation occurs after a predetermined time elapses. A time interval between the finish of the exhalation and the start of the inhalation can be defined as an apnea interval.

Thus, the present disclosure proposes a control algorithm for accurately determining the time point at which the inhalation actually occurs.

In operation S3, the mask apparatus 1 calculates a time difference between the time point corresponding to the maximum pressure value and the time point corresponding to the minimum pressure value. For example, the controller of the mask apparatus 1 can determine (i) a first maximum time point corresponding to the maximum pressure value of any one breathing cycle (e.g., a first breathing cycle), (ii) a first minimum time point corresponding to the minimum pressure value of the first breathing cycle, and (iii) a first time difference between the first maximum time point corresponding to the maximum pressure value of the first breathing cycle and the first minimum time point corresponding to the minimum pressure value of the first breathing cycle.

Then, in operation S4, the controller of the mask apparatus 1 determines an expected time point of the inhalation in the next breathing cycle based on the analyzed breathing cycle and the calculated time difference.

In operation S5, the controller of the mask apparatus 1 increases in rotation speed of the fan module when the expected time point of the inhalation arrives.

Figure 10:
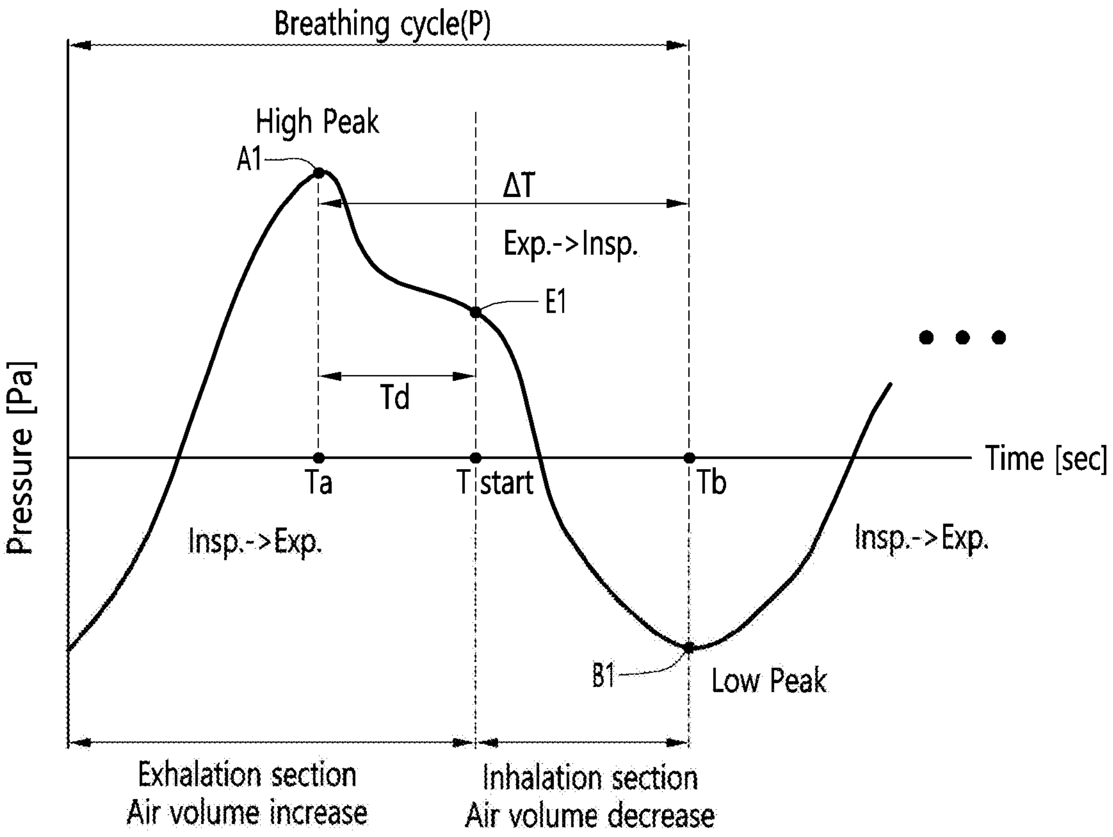
FIG. 10 is a view illustrating an example of a pressure change cycle in a breathing space of the mask apparatus during one breathing cycle of a user wearing the mask apparatus.
Figure 11:
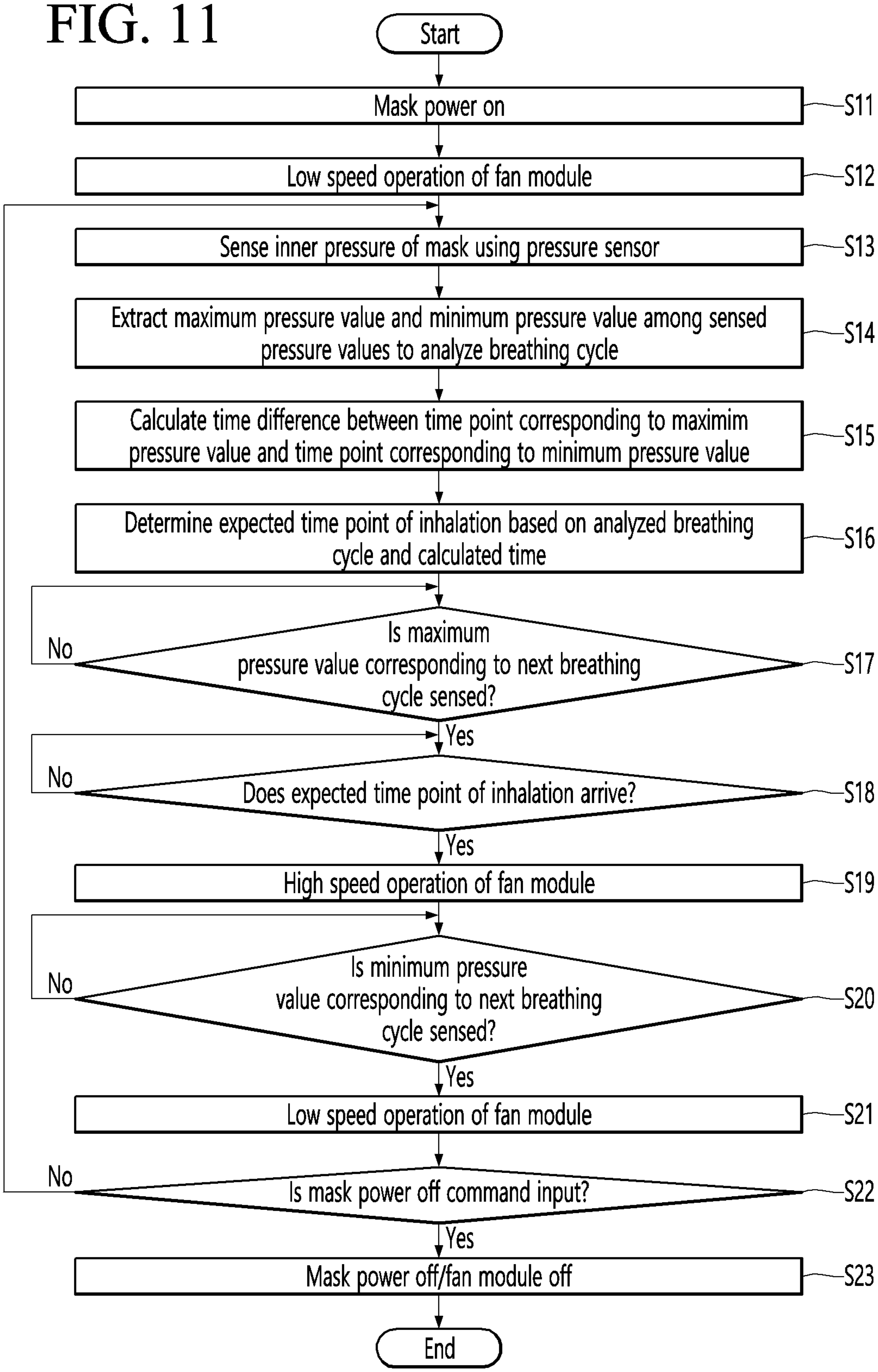
FIG. 11 is a flowchart illustrating an example of a method for controlling a mask apparatus.

FIG. 10 is a view illustrating an example of a pressure change cycle in the breathing space of the mask apparatus during one breathing cycle of a user wearing the mask apparatus, and FIG. 11 is a detailed flowchart illustrating an example of a method for controlling a mask apparatus.

In some implementations, as illustrated in FIG. 10, the controller of the mask apparatus 1 can calculate a time difference ΔT between a time point Ta, at which a maximum pressure value A1 is sensed, and a time point Tb, at which a minimum pressure value B1 is seated, in one breathing cycle P.

In some implementations, the time difference ΔT between the time point Ta at which the maximum pressure value A1 is sensed and the time point Tb at which the minimum pressure value B1 is sensed can be, for example, about 2 seconds.

In some implementations, the pressure sensor 14 senses the maximum pressure value A1 at a predetermined time point Ta in the next breathing cycle P. Then, the controller of the mask apparatus 1 can determine a time point at which a time Td corresponding to about 20% to about 50% of the calculated time difference ΔT elapses from the time point Ta as an inhalation expected time point $T_{start}$ in the next breathing cycle P.

For example, when the calculated time difference ΔT is 2 seconds, the inhalation expected time point $T_{start}$ can be presumed to be a time point at which a time of 0.4 seconds to 1 second elapses from the time point Ta at which the maximum pressure value A1 is sensed in the next breathing cycle.

As described above, the controller of the mask apparatus 1 can expect the user's next breathing cycle through the analyzed breathing cycle. In some examples, when the maximum pressure value is sensed in the next breathing cycle, and the predetermined time Td elapses from the time point at which the maximum pressure is sensed, the mask apparatus 1 can allow the rotation speed of the fan module to increase so as to facilitate the user's breathing. The predetermined time means a time corresponding to about 20% to about 50% of the time ΔT taken from the time point at which the maximum pressure is sensed in the previous breathing cycle up to the time at which the minimum pressure value is sensed.

Referring to FIG. 11, in operation S11, power of the mask apparatus 1 is turned on, and in operation S12, a low speed operation of the fan module is started.

When the power of the mask apparatus 1 is turned on, the fan modules 16 and 17 is operated. Here, each of the fan modules 16 and 17 performs the low speed operation.

The reason why each of the fan modules 16 and 17 is operated at the low speed is not only to facilitate the user's breathing, but also to remove moisture or water vapor from the inside of the mask apparatus 1.

When each of the fan modules 16 and 17 are operated at a high speed from the beginning, the user can feel uncomfortable during the breathing. In addition, the pressure value sensed by the pressure sensor 14 can be unstable due to air resistance caused by the high-speed rotation of each of the fan modules 16 and 17.

In operation S13, as described above, the controller of the mask apparatus 1 can sense a change in inner pressure of the mask for a predetermined time through the pressure sensor 14. When the pressure value is sensed by the pressure sensor 14, a pressure change graph can be generated and stored in the controller of the mask apparatus 1 as illustrated in FIG. 9. In some examples, a breathing cycle graph as illustrated in FIG. 10 is extracted.

In operation S14, the mask apparatus 1 analyzes and calculates the breathing cycle by extracting the maximum pressure value and the minimum pressure value among the sensed pressure values. For example, the breathing cycle can be understood as a time that is taken from a time point, at which the current maximum pressure value (or minimum pressure value) is sensed, to a time point at which the next maximum pressure value (or minimum pressure value) is sensed. That is, one breathing cycle can be defined by a period of time between two adjacent time points at which two maximum air pressure values are sensed or at which two minimum air pressure values are sensed.

In some implementations, the mask apparatus 1 extracts information on the user's inhalation and exhalation through pressure data sensed through the pressure sensor 14.

In operation S15, the mask apparatus 1 calculates a time difference between the time point corresponding to the maximum pressure value and the time point corresponding to the minimum pressure value.

In operation S16, the controller of the mask apparatus 1 determines an expected time point of the inhalation based on the analyzed breathing cycle and the calculated time difference.

In operation S17, the mask apparatus 1 determines whether a maximum pressure value corresponding to the next breathing cycle is sensed.

As illustrated in FIG. 9, the mask apparatus 1 can sense a maximum pressure value A2 corresponding to the next breathing cycle.

For example, the mask apparatus 1 can sense the maximum pressure value A1 corresponding to the previous breathing cycle and then sense the minimum pressure value B1 corresponding to the previous breathing cycle. Thereafter, the mask apparatus 1 can sense the maximum pressure value A2 corresponding to the next breathing cycle.

When the maximum pressure value A2 corresponding to the next breathing cycle is sensed, in operation S18, the mask apparatus 1 determines whether an expected time point of inhalation arrives based on data extracted during the previous breathing cycle.

As described above, the controller of the mask apparatus 1 determines whether a time (e.g., about 0.4 seconds to about 1 second) corresponding to about 20% to about 50% of the time difference between the time point corresponding to the maximum pressure value A1 and the time point corresponding to the minimum pressure value B1 in the previous breathing cycle elapses.

When it is determined that the expected time point of the inhalation arrives, in operation S19, the controller of the mask apparatus 1 changes the operating speed of the fan module.

In some implementations, when the expected time point of the inhalation arrives, the controller of the mask apparatus 1 allows an operation mode of each of the fan modules 16 and 17 to be converted from a low speed operation mode to a high speed operation mode.

The reason for converting the operation mode of the fan modules 16 and 17 to the high-speed operation is to facilitate the breathing of the wearer by rapidly blowing external air into the inside of the mask apparatus 1 when the wearer inhales.

The mask apparatus 1 can maintain the high rotation speed of each of the fan modules 16 and 17 for a predetermined period from the expected time point of the inhalation.

In operation S20, the mask apparatus 1 determines whether the pressure sensor 14 senses the minimum pressure value, and when the minimum pressure value B2 is sensed, in operation S21, the controller of the mask apparatus 1 converts the operation mode of the fan module to the low speed operation.

The reason for converting the operation mode of each of the fan modules 16 and 17 to the low speed operation mode is to allow the air inhaled and exhaled by the wearer to be quickly discharged to the outside of the mask apparatus 1. If each of the fan modules 16 and 17 is maintained at the high speed operation when the wearer exhales, air introduced from the outside can act as resistance, and thus, it can be difficult for the user to exhale.

The mask apparatus 1 can maintain the low rotation speed of each of the fan modules 16 and 17 for a predetermined period from the expected time point of the exhalation.

Thereafter, in operation S22, the mask apparatus 1 determines whether a mask power-off command is input.

For example, when the wearer needs to remove the mask apparatus 1 or stop using of the mask, the wearer can input the mask power-off command.

The mask power-off command can be input through a manipulation portion 195 installed on an outer surface of the mask apparatus 1.

When the mask power-off command is input, the mask apparatus 1 turns off power of the mask and fan module in operation S23.

If the mask power-off command is not input, the mask apparatus 1 returns to the operation S13 and repeats the operations after the operation S13.

In some implementations, the controller of the mask apparatus 1 can determine the expected time point of the inhalation again for each breathing cycle as the breathing state of the wearer changes in real time.

For example, the wearer's breathing state can vary depending on a state in which the wearer is walking, running, or exercising. Therefore, when the analysis of one breathing cycle is completed, the rotation speed of the fan module can increase at the expected time point of the inhalation in the next breathing cycle, and the next breathing cycle can be analyzed to determine the expected time point of the inhalation at the next breathing cycle.

In some implementations, a process of monitoring the rotation speed of each of the fan modules 16 and 17 can be further performed. In some implementations, in operation S13 in which a pressure inside the mask apparatus 1 is sensed using a pressure sensor, a step in which a change in pressure depending on the rotation speed of the fan modules 16 and 17 is reflected to the sensed inner pressure of the mask is further performed.

In some implementations, the pressure change value caused by the fan driving can be estimated to be reflected to the sensed value of the pressure sensor, thereby accurately sensing the pressure of the mask.

Figure 12:
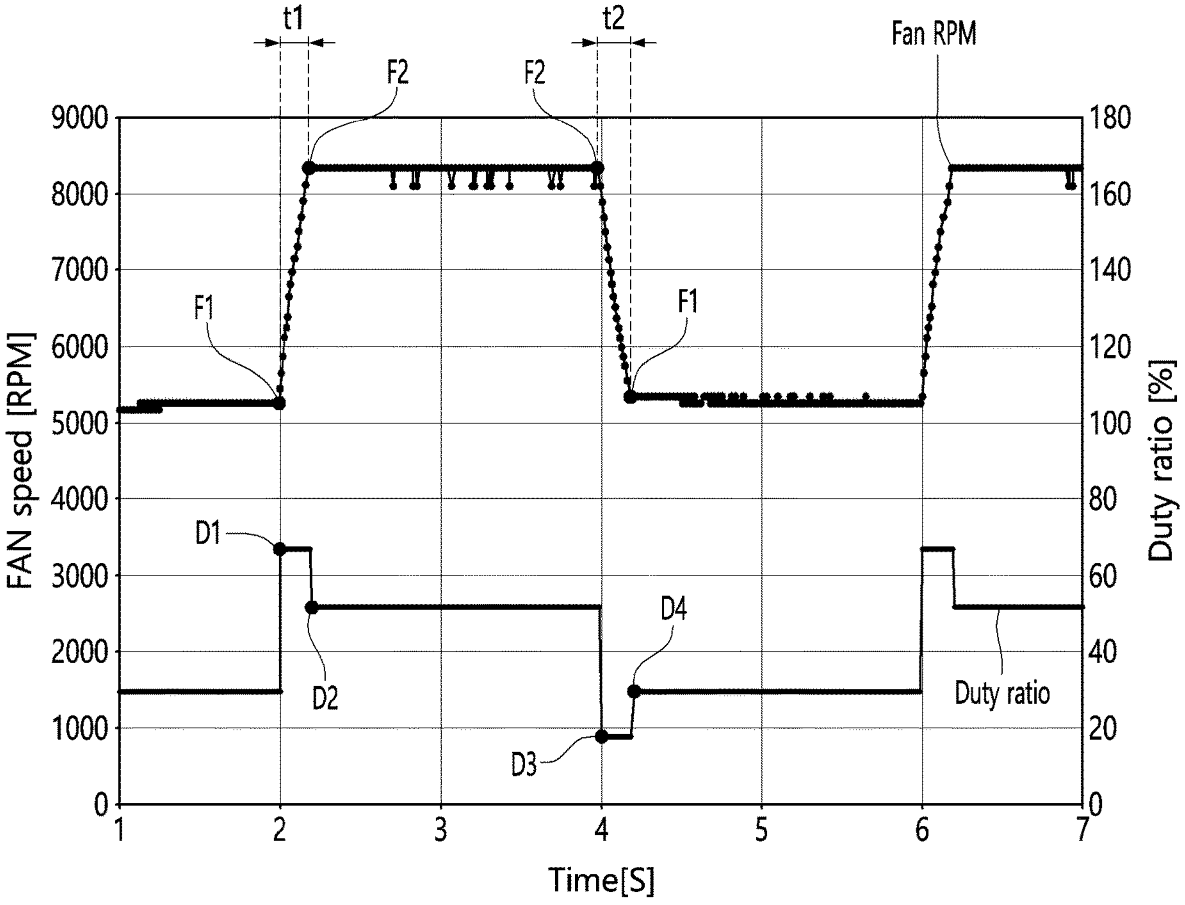
FIG. 12 is a graph illustrating an example of a rotation speed of a fan due to an input of a duty ratio to a fan module.

FIG. 12 is a graph illustrating an example of a rotation speed of the fan due to an input of a duty ratio to the fan module.

Referring to FIG. 12, an upper graph shows a rotation speed (RPM) of the fan module, and a lower graph shows a duty ratio of a pulse to the fan module.

In some examples, when the fan module is converted from a low speed operation F1 to a high speed operation F2, the duty ratio is changed to about 70% from the existing about 30% at the time point D1 at which the high speed operation is started to adjust the rotation speed.

The mask apparatus 1 can rapidly increase the rotation speed of the fan by excessively inputting the duty ratio (about 70%) greater than the duty ratio (about 50%) corresponding to a target rotation speed of the fan module. For example, the controller of the mask apparatus 1 can determine a duty ratio that is greater than a target duty ratio which is determined based on the target rotation speed of the fan module, and provide the fan modules 16 and 17 with the duty ratio greater than the target duty ratio to increase the rotation speed of the fan modules 16 and 17.

In some cases, a first time t1 may take to increase the rotation speed of the fan module from the low rotation speed F1 to the high rotation speed F2, which is the target rotation speed.

For example, the first time t1 can be about 0.2 seconds.

In some examples, the duty ratio is changed to a normal ratio of about 50% to maintain the rotation speed at a time point D2 at which the fan module reaches the target rotation speed F2.

In some examples, when the fan module is converted from the high speed operation F1 to the low seed operation F2, the duty ratio is changed to about 20% from the existing about 50% at the time point D3 at which the low speed operation is started to adjust the rotation speed.

Here, the mask apparatus 1 can rapidly decrease in rotation speed of the fan by inputting the duty ratio (about 20%) less than the duty ratio (about 30%) corresponding to a target rotation speed of the fan module.

In some cases, a second time t2 may take to decrease the rotation speed of the fan module from the high rotation speed F2 to the low rotation speed F1, which is the target rotation speed.

For instance, the second time t2 can be about 0.2 seconds.

In some examples, the duty ratio is changed to a normal ratio of about 30% to maintain the rotation speed at a time point D4 at which the fan module reaches the target rotation speed F1.

In some implementations, when the time point at which the rotation speed increases arrives, the duty ratio can be set higher than the duty ratio depending on the target rotation speed to reduce the time taken to reach the target rotation speed.

In addition, when the time point at which the rotation speed decreases arrives, the duty ratio can be set lower than the duty ratio depending on the target rotation speed to reduce the time taken to reach the target rotation speed.

In some implementations, the duty ratio input to the pulse of the fan motor can be appropriately adjusted to reduce the time taken to reach the target rotation speed to help the wearer's breathing according to the fan rotation.

What is claimed is:

1. A mask apparatus comprising:

a mask body;

a fan module configured to be coupled to the mask body;

a seal that is coupled to a rear surface of the mask body and defines a breathing space therein;

a pressure sensor coupled to the mask body and configured to sense an air pressure in the breathing space;

a mask body cover coupled to a front surface of the mask body and configured to cover the fan module; and a controller coupled to the mask body and configured to control a rotation speed of the fan module based on the air pressure sensed by the pressure sensor, wherein the controller is configured to:

determine a first breathing cycle based on a maximum pressure value and a minimum pressure value among a plurality of air pressure values sensed by the pressure sensor, determine a first time difference between a first maximum time point corresponding to the maximum pressure value of the first breathing cycle and a first minimum time point corresponding to the minimum pressure value of the first breathing cycle, determine an expected time point of inhalation in a second breathing cycle based on the first breathing cycle and the first time difference, and increase the rotation speed of the fan module based on a current time corresponding to the expected time point of inhalation.

2. The mask apparatus according to claim 1, wherein the controller is configured to:

operate the fan module at a first speed for a predetermined time based on power being applied to the mask apparatus, and receive a first air pressure sensed by the pressure sensor while operating the fan module at the first speed.

3. The mask apparatus according to claim 1, wherein the first breathing cycle is defined by a period of time between two adjacent time points at which two maximum air pressure values are sensed or at which two minimum air pressure values are sensed.

4. The mask apparatus according to claim 1, wherein the controller is configured to vary the expected time point of inhalation in a subsequent breathing cycle based on a current breathing cycle and a current time difference.

5. The mask apparatus according to claim 1, wherein the controller is configured to determine the expected time point of inhalation of the second breathing cycle based on a time point corresponding to 20% to 50% of the first time difference from a time point corresponding to a maximum pressure value of the second breathing cycle.

6. The mask apparatus according to claim 5, wherein the controller is configured to:

determine a minimum pressure value of the second breathing cycle, and reduce the rotation speed of the fan module based on the current time corresponding to a time point corresponding to the minimum pressure value of the second breathing cycle.

7. The mask apparatus according to claim 6, wherein the controller is configured to:

determine a duty ratio of the fan module, the duty ratio being less than a target duty ratio that is determined based on a target rotation speed; and input the duty ratio to the fan module to decrease the rotation speed of the fan module.

8. The mask apparatus according to claim 1, wherein the controller is configured to determine whether a power-off command of the mask apparatus is input.

9. The mask apparatus according to claim 8, wherein the controller is configured to, based on determining that the power-off command of the mask apparatus is not input, determine a second time difference between a second maximum time point corresponding to a maximum pressure value of the second breathing cycle and a second minimum time point corresponding to a minimum pressure value of the second breathing cycle.

10. The mask apparatus according to claim 1, wherein the controller is configured to:

determine a duty ratio of the fan module, the duty ratio being greater than a target duty ratio that is determined based on a target rotation speed of the fan module; and input the duty ratio to the fan module to increase the rotation speed of the fan module.

11. A method for controlling a mask apparatus, the method comprising:

supplying power to the mask apparatus to operate a pressure sensor of the mask apparatus;

sensing, by the pressure sensor, an air pressure in a breathing space that is defined in the mask apparatus;

receiving, by a controller of the mask apparatus, a plurality of pressure values sensed by the pressure sensor;

determining a first breathing cycle based on a maximum pressure value and a minimum pressure value among the plurality of pressure values sensed by the pressure sensor;

determining a first time difference between a first maximum time point corresponding to the maximum pressure value of the first breathing cycle and a first minimum time point corresponding to the minimum pressure value of the first breathing cycle;

determining an expected time point of inhalation in a second breathing cycle based on the first breathing cycle and the first time difference; and controlling a rotation speed of a fan module of the mask apparatus, wherein controlling the rotation speed of the fan module comprises increasing the rotation speed of the fan module based on a current time corresponding to the expected time point of inhalation.

12. The method according to claim 11, further comprising:

based on power being applied to the mask apparatus, operating the fan module at a first speed for a predetermined time; and transmitting, to the controller, a first pressure value sensed by the pressure sensor while operating the fan module at the first speed.

13. The method according to claim 11, wherein the first breathing cycle is determined based on a period of time between two adjacent time points at which two maximum air pressure values are sensed or at which two minimum air pressure values are sensed.

14. The method according to claim 11, further comprising:

varying the expected time point of inhalation of a subsequent breathing cycle based on a current breathing cycle and a current time difference.

15. The method according to claim 11, wherein the expected time point of inhalation is determined based on a time point corresponding to 20% to 50% of the first time difference from a time point corresponding to a maximum pressure value of the second breathing cycle.

16. The method according to claim 11, further comprising:

determining a minimum pressure value of the second breathing cycle; and decreasing the rotation speed of the fan module at a second minimum time point corresponding to the minimum pressure value of the second breathing cycle.

17. The method according to claim 11, further comprising:

determining a duty ratio of the fan module, the duty ratio being less than a target duty ratio determined based on a target rotation speed of the fan module; and inputting the duty ratio to the fan module to decrease the rotation speed of the fan module.

18. The method according to claim 11, further comprising:

determining whether a power-off command of the mask apparatus is input.

19. The method according to claim 18, further comprising:

based on determining that the power-off command of the mask apparatus is not input, determining a second time difference between a second maximum time point corresponding to a maximum pressure value of the second breathing cycle and a second minimum time point corresponding to a minimum pressure value of the second breathing cycle.

20. The method according to claim 11, further comprising:

determining a duty ratio of the fan module, the duty ratio being greater than a target duty ratio determined on a target rotation speed of the fan module; and inputting the duty ratio to the fan module to increase the rotation speed of the fan module.

* * * * *